US011693543B2

(12) United States Patent
Bhadouriya et al.

(10) Patent No.: US 11,693,543 B2
(45) Date of Patent: Jul. 4, 2023

(54) ELECTRONIC DEVICE AND METHOD FOR OPTIMIZING USER INTERFACE OF APPLICATION

(71) Applicant: Samsung Electronics Co., Ltd., Suwon-si (KR)

(72) Inventors: Ramendra Singh Bhadouriya, Noida (IN); Abhishek Mishra, Noida (IN); Vaibhav Mishra, Noida (IN); Ashutosh Gupta, Noida (IN); Tarun Gupta, Noida (IN); Gaurav Sikarwar, Noida (IN); Sai Hemanth Kasaraneni, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 84 days.

(21) Appl. No.: 17/358,913

(22) Filed: Jun. 25, 2021

(65) Prior Publication Data
US 2022/0164088 A1      May 26, 2022

(30) Foreign Application Priority Data
Nov. 23, 2020   (IN) .............................. 202041050932

(51) Int. Cl.
*G06F 3/04842*    (2022.01)
*G06N 20/00*      (2019.01)
(Continued)

(52) U.S. Cl.
CPC ........ *G06F 3/04842* (2013.01); *G06F 3/0482* (2013.01); *G06F 9/451* (2018.02);
(Continued)

(58) Field of Classification Search
CPC ...... G06F 3/0482; G06F 9/451; G06F 40/253; G06F 40/30; G06F 3/04842; G06N 20/00; H04M 1/72472
(Continued)

(56) References Cited

U.S. PATENT DOCUMENTS 6,721,706 B1    4/2004   Strubbe et al.
8,560,128 B2   10/2013   Ruff et al.
(Continued)

FOREIGN PATENT DOCUMENTS

KR          10-1451661 B1    10/2014
KR      10-2017-0005706 A     1/2017
(Continued)

OTHER PUBLICATIONS

International Search Report dated Sep. 27, 2021, issued in International Patent Application No. PCT/KR2021/007032.
(Continued)

*Primary Examiner* — William D Titcomb
(74) *Attorney, Agent, or Firm* — Jefferson IP Law, LLP

(57) ABSTRACT

A method for optimizing a UI of an application in an electronic device is provided. The method includes detecting, by the electronic device, at least one first application installed in the electronic device, determining, by the electronic device, at least one data item associated with at least one UI of the at least one first application to be modified, modifying, by the electronic device, the at least one data item associated with the at least one UI of the at least one first application based on a level of proficiency of a user with an already used application in the electronic device, and displaying, by the electronic device, the at least one UI with the at least one modified data item of the at least one first application.

24 Claims, 24 Drawing Sheets

(51) Int. Cl.
  *G06F 9/451* (2018.01)
  *H04M 1/72472* (2021.01)
  *G06F 40/30* (2020.01)
  *G06F 40/253* (2020.01)
  *G06F 3/0482* (2013.01)

(52) U.S. Cl.
  CPC ............ *G06F 40/253* (2020.01); *G06F 40/30* (2020.01); *G06N 20/00* (2019.01); *H04M 1/72472* (2021.01)

(58) Field of Classification Search
  USPC ........................................................ 715/765
  See application file for complete search history.

(56) References Cited

U.S. PATENT DOCUMENTS

| | | | |
|---|---|---|---|
| 9,389,882 B2* | 7/2016 | Armstrong | G06F 3/04842 |
| 9,794,443 B2 | 10/2017 | Su et al. | |
| 10,594,757 B1* | 3/2020 | Shevchenko | G06F 40/35 |
| 10,785,310 B1 | 9/2020 | Mohen et al. | |
| 11,112,950 B2* | 9/2021 | Srivastava | A61B 5/0002 |
| 2006/0075360 A1* | 4/2006 | Bixler | G06F 3/04842 |
| | | | 715/805 |
| 2009/0177764 A1 | 7/2009 | Blatherwick et al. | |
| 2010/0121921 A1 | 5/2010 | Dunton | |
| 2013/0326382 A1* | 12/2013 | Nogami | G06F 16/9577 |
| | | | 715/765 |
| 2014/0082514 A1 | 3/2014 | Sivaraman et al. | |
| 2016/0260017 A1 | 9/2016 | Joao Viol Vieira et al. | |
| 2016/0293049 A1* | 10/2016 | Monahan | G09B 9/058 |
| 2016/0364115 A1* | 12/2016 | Joung | G06F 3/04842 |
| 2018/0164970 A1 | 6/2018 | Volkerink | |
| 2019/0114300 A1 | 4/2019 | Miltsakaki | |
| 2019/0220181 A1 | 7/2019 | Stachniak et al. | |
| 2019/0258358 A1 | 8/2019 | Ramadge et al. | |
| 2019/0361579 A1* | 11/2019 | Srivastava | G06F 9/451 |
| 2019/0361588 A1 | 11/2019 | Sepczuk | |
| 2020/0128097 A1 | 4/2020 | Zhang et al. | |
| 2020/0356865 A1* | 11/2020 | D'Auria | G06N 3/08 |
| 2020/0372206 A1* | 11/2020 | Fialkow | G06F 16/958 |
| 2021/0307652 A1* | 10/2021 | Lari | G06N 7/005 |

FOREIGN PATENT DOCUMENTS

| | | |
|---|---|---|
| KR | 10-1700516 B1 | 1/2017 |
| WO | 2014/200692 A1 | 12/2014 |

OTHER PUBLICATIONS

Indian Office Action dated Jun. 6, 2022, issued in Indian Patent Application No. 202041050932.

* cited by examiner

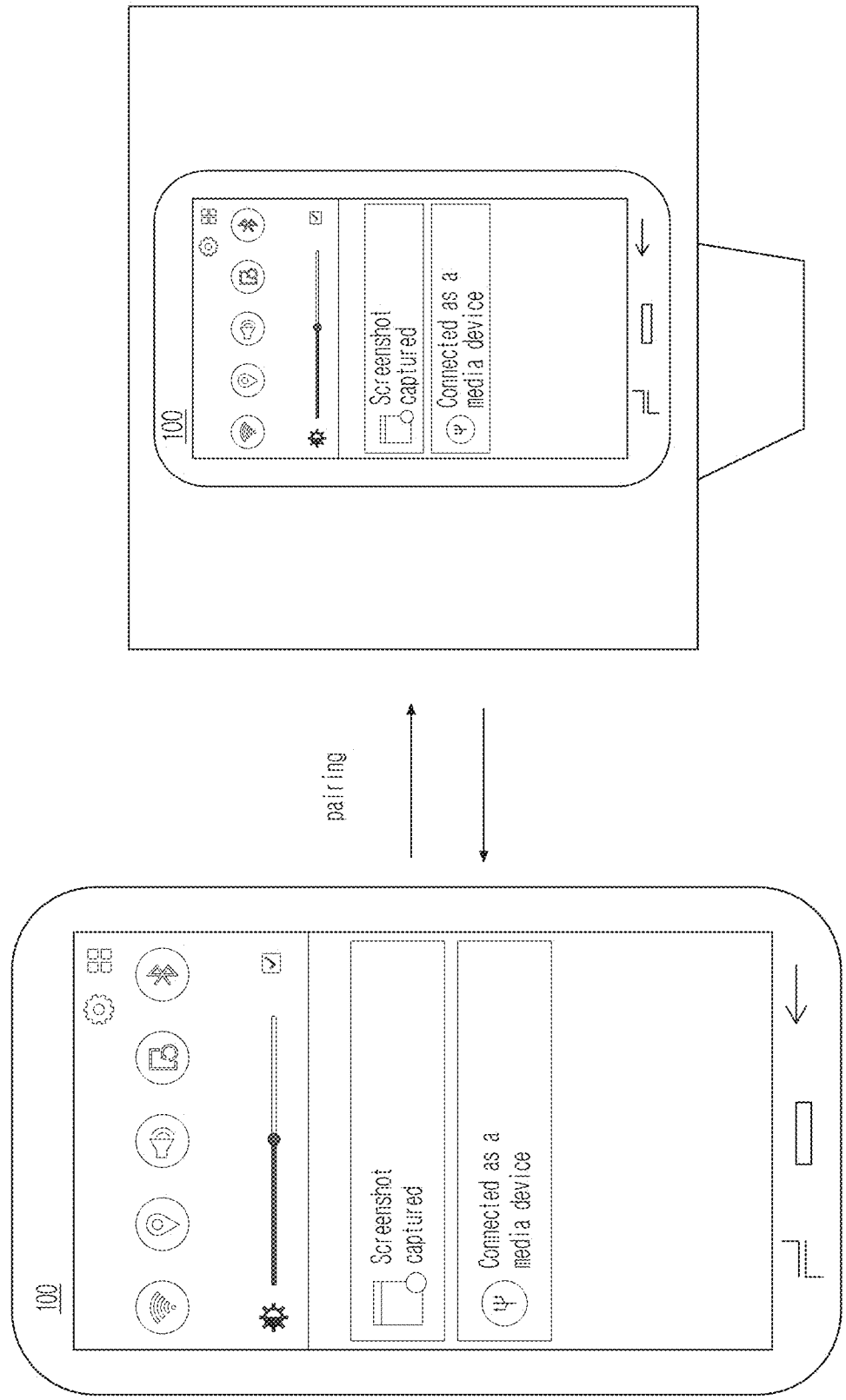

ELECTRONIC DEVICE AND METHOD FOR OPTIMIZING USER INTERFACE OF APPLICATION

CROSS-REFERENCE TO RELATED APPLICATION(S)

This application is based on and claims priority under 35 U.S.C. § 119(a) of an Indian patent application number 202041050932, filed on Nov. 23, 2020, in the Indian Intellectual Property Office, the disclosure of which is incorporated by reference herein in its entirety.

BACKGROUND

1. Field

The disclosure relates to a method for optimizing a user interface (UI) of an application in an electronic device. More particularly, the disclosure relates to a method and electronic device for optimizing the UI of the application based on a level of proficiency of a user with an already used application in the electronic device.

2. Description of Related Art

Whenever a user of an electronic device downloads a new application, an UI of the new application becomes too complex to use by the user of the electronic device. Further, the user of the electronic device has to put much effort to understand the UI, content associated with the UI, and interactions of the new application in the electronic device. Further, the user of the electronic device needs to adapt to the UI component/interaction associated with the content provided by any newly installed application. This results in reducing the user experience.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for optimizing a UI of an application in an electronic device based on a level of proficiency of a user with an already used application in the electronic device. This results in enhancing the user experience.

Additional aspects will be set forth in part in the description which follows and, in part, will be apparent from the description, or may be learned by practice of the presented embodiments.

In accordance with an aspect of the disclosure, a method for optimizing a UI of an application in an electronic device is provided. The method includes detecting, by the electronic device, at least one first application installed in the electronic device. The first application is a new application installed in the electronic device or an already installed application in the electronic device. Further, the method includes determining, by the electronic device, at least one data item associated with at least one UI of the at least one first application to be modified. Further, the method includes modifying, by the electronic device, the at least one data item associated with the at least one UI of the at least one first application based on a level of proficiency of a user with an already used application in the electronic device. Further, the method includes displaying, by the electronic device, the at least one UI with the at least one modified data item of the at least one first application.

In an embodiment, the at least one data item comprises user interaction on the at least one UI, content on the at least one UI, and a component on the at least one UI.

In an embodiment, modifying, by the electronic device, the at least one data item associated with the at least one UI of the at least one first application based on the level of proficiency of the user with the already used application in the electronic device includes acquiring, by the electronic device, the level of proficiency of the user with at least one data item associated with a UI of the already used application in the electronic device using a machine learning model, selecting the at least one data item associated with the at least one UI of the at least one first application based on the level of proficiency of the user with the at least one data item associated with the UI of the already used application in the electronic device using the machine learning model, and modifying, by the electronic device, the at least one data item associated with the at least one UI of the at least one first application in response to selecting the at least one data item associated with the at least one UI of the at least one first application.

In an embodiment, selecting the at least one data item associated with the at least one UI of the at least one first application based on the level of proficiency of the user with the at least one data item associated with the UI of the already used application in the electronic device using the machine learning model includes generating, by the electronic device, at least one of a content selection model, an interaction selection model, and an interface selection model based on the level of proficiency of the user with the at least one data item associated with the UI of the already used application in the electronic device, and selecting the at least one data item associated with the at least one UI of the at least one first application based on at least one of the generated content selection model, the generated interaction selection model, and the generated interface selection model.

In an embodiment, the content selection model is generated by formatting a dependency tree of the content that allows proper connectivity of words as per grammar of language, performing at least one of a syntax analysis, a semantic analysis, a discourse analysis, and a pragmatic analysis on the content, and generating the content selection model based on at least one of the syntax analysis, the semantic analysis, the discourse analysis, and the pragmatic analysis on the content.

In an embodiment, the syntax analysis involves framing the sentence as per grammar of a language.

In an embodiment, the semantic analysis involves understanding and analyzing a meaning of a sentence understandable to a user of the electronic device.

In an embodiment, the discourse analysis involves checking a context of a previous statement so that coherence of all sentences are maintained.

In an embodiment, the pragmatic analysis is used to check a sentence for validation as per practical knowledge.

In an embodiment, the level of proficiency of the user with the already used application in the electronic device is determined by learning at least one of a usage and modification on the at least one data item associated with at least one UI of the already used application in the electronic device over a period of time using a plurality of parameters, training a machine learning model in response to learning at least one of the usage and the modification on the at least one data item associated with at least one UI of the already used application in the electronic device over the period of time, and determining the level of proficiency of the user with the already used application in the electronic device using the machine learning model.

In an embodiment, the plurality of learning parameters comprise at least one of a trip characteristics, the action status, a UI visibility, a correction pattern, erasability information, a completion status, a text proficiency, an interaction proficiency, and an interface proficiency.

In accordance with another aspect of the disclosure, an electronic device for optimizing a UI of an application is provided. The electronic device includes a UI optimization controller coupled with a memory and a processor. The UI optimization controller is configured to detect at least one first application installed in the electronic device. Further, the UI optimization controller is configured to determine at least one data item associated with at least one UI of the at least one first application to be modified. Further, the UI optimization controller is configured to modify the at least one data item associated with the at least one UI of the at least one first application based on a level of proficiency of a user with already used application in the electronic device. Further, the UI optimization controller is configured to display the at least one UI with the at least one modified data item of the at least one first application.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 10A and 10B illustrate example scenarios in which behavior adaptation in an existing UI when electronic devices are connected to each other, according to various embodiments of the disclosure.

Throughout the drawings, it should be noted that like reference numbers are used to depict the same or similar elements, features, and structures.

DETAILED DESCRIPTION

Figure 1:
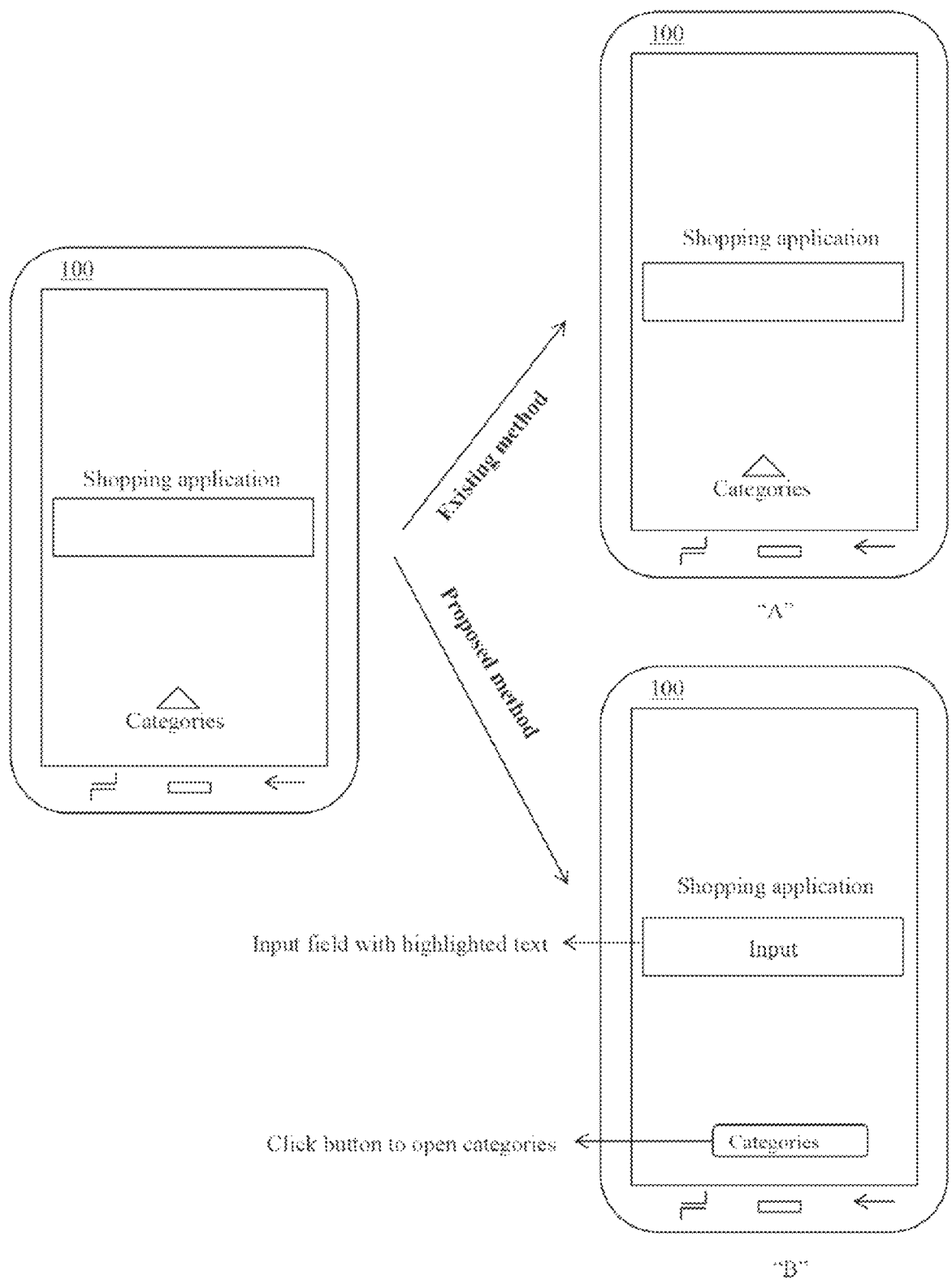
FIG. 1 illustrates an example scenario in which an electronic device optimizes a UI of an application, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein achieve a method for optimizing a UI of an application in an electronic device. The method includes detecting, by the electronic device, at least one first application installed in the electronic device. Further, the method includes determining, by the electronic device, at least one data item associated with at least one UI of the at least one first application to be modified. Further, the method includes modifying, by the electronic device, the at least one data item associated with the at least one UI of the at least one first application based on a level of proficiency of a user with an already used application in the electronic device. Further, the method includes displaying, by the electronic device, the at least one UI with the at least one modified data item of the at least one first application.

Unlike conventional methods and systems, the method can be used for optimizing the UI of the application in the electronic device based on the level of proficiency of the user with the already used application in the electronic device. This results in enhancing the user experience. Further, the user of the electronic device does not put much effort to understand UI, the content associated with the UI, and the interactions of the application in the electronic device. The method can be used for detecting real time comfort of the user with the UI/interaction associated the content for the electronic device. The method can be used for understanding an Internet of Things (IoT) multi-device environment by adapting functionality of connected device on the electronic device. (In an example, adapting television (TV) functionality on the smart phone while the smart phone is connected with the smart TV).

The method can be used to suggest more user friendly applications with same/similar functions and features and provide best application version with most required features available easily by decreasing user commands and understanding user usual intentions. The method can be used to activate device features automatically based on inference drawn from user interactions with the electronic device. The method can be used to alter the UI based on user's knowledge graph/user historical communication pattern.

Based on the proposed methods, the electronic device has capabilities of modifies single control, an entire interface layout or even interactions, visible content in a multi-device environment based on the user historical communication pattern. The method can be used to change in the device language encompasses changes in content, interaction, function of the control and can generate new interactions and content as well for user's proficiency level. The method can be used to monitor the user's trip interaction both with the control as well as outside a control for seeking help in completing the function in the application. This results in enhancing the user experience.

The method can be implemented in a multi-device environment and used to learn functionality of one device and overlay it on another user's device.

Referring now to the drawings, and more particularly to FIGS. 1, 2A, 2B, 3, 4A to 4C, 5A, 5B, 6A to 6C, 7A to 7C, 8A to 8C, 9A to 9C, 10A, 10B, and 11, there are shown preferred embodiments.

FIG. 1 illustrates an example scenario in which an electronic device optimizes a UI of an application, according to an embodiment of the disclosure.

Referring to FIG. 1, an electronic device 100 can be, for example but not limited to, a cellular phone, a smart phone, a smart watch, a smart fridge, a smart TV, a smart washing machine, a smart dishwasher, a closed-circuit television (CCTV), a Personal Digital Assistant (PDA), a tablet computer, a laptop computer, a virtual reality device, an immersive system, and an IoT device. A UI 160 can be a graphical UI. The application can be, for example, but not limited to a contact application, a gallery application, a photo editing application, a beauty application, a smart thing application, a music player application, a portable document format (PDF) viewer application, a video application, a shopping application, a food related application, and a health related application.

In an embodiment, the electronic device 100 is configured to detect a first application installed in the electronic device 100. The first application can be a new application installed in the electronic device 100 or an already installed application in the electronic device 100. In an example, after detecting the new application installed in the electronic device 100, the electronic device 100 is configured to determine a data item associated with the UI 160 of the new application to be modified. The data item can be, for example, but not limited to a user interaction on the UI 160, a content on the UI 160, and a component on the UI 160. The user interaction can be, for example, but not limited to a swipe interaction, a single click interaction, and gesture interaction. The component can be, for example, but not limited to a button on the application, a radio button on the application, a drop-down list on the application. The content can be, for example, but not limited to a text and an image. Further, the electronic device 100 is configured to modify the data item associated with the UI 160 of the new application based on a level of proficiency of a user with an already used application in the electronic device 100.

The level of proficiency of the user with the already used application in the electronic device 100 is determined by learning a usage and modification on the data item associated with the UI 160 of the already used application in the electronic device over a period of time using a plurality of parameters, training a machine learning (ML) model using an ML controller (e.g., Machine learning controller 150 as shown in the FIG. 2A) in response to learning the usage and the modification on the data item associated with the UI 160 of the already used application in the electronic device 100 over the period of time, determining the level of proficiency of the user with the already used application in the electronic device 100 using the machine learning model. The plurality of learning parameters can be, for example, but not limited to a trip characteristics, the action status, a UI visibility, a correction pattern, erasability information, and a completion status.

The correction pattern indicates a correction behavior of the user with respect to the content on the application. In an example, a scene is corrected to seen on the application. The erasability information indicates that what content user erases and replaces with new text. In an example, the user replaces the seen with observed. The completion status indicates that if the user has completed the modification task and actually saved the content. The UI visibility indicates that all components and features are visible to user or not. The action status indicates that if the user is switching application or activity or context, the corresponding action has been completed or not. The trip characteristics indicates that all the interactions done by the user in a trip to complete a task. The interaction parameter indicates that the interaction done by the user with the available UI.

In an embodiment, the electronic device 100 is configured to acquire a level of proficiency of the user with the data item associated with the UI 160 of the already used application in the electronic device 100 using the machine learning model. Further, the electronic device 100 is configured to select the data item associated with the UI 160 of the new application based on the level of proficiency of the user with the data item associated with the UI 160 of the already used application in the electronic device 100 using the machine learning model. The data item associated with the UI 160 of the new application is selected by generating a content selection model, an interaction selection model, and an interface selection model based on the level of proficiency of the user with the data item associated with the UI 160 of the already used application in the electronic device 100, and selecting the data item associated with the UI 160 of the new application based on the generated content selection model, the generated interaction selection model, and the generated interface selection model. Further, the electronic device 100 is configured to modify the data item associated with the UI 160 of the new application in response to selecting the data item associated with the UI 160 of the new application.

After modifying the data item associated with the UI 160 of the new application, a UI optimization controller 140 is configured to display the UI 160 with the modified data item of the new application.

Consider, the user of a smart phone installs the shopping application. The smart phone identifies that the shopping application is installed and determines that one or more data items associated with the UI of the shopping application to be modified based on the level of proficiency of the user with the already used application (e.g., food related application, health related application, etc.) in the smart phone. In an example, the user may prefer to use a button component instead of a swipe component. Similarly, the user may prepare to identify an input field based on highlighted text in the input component. Based on the level of proficiency of the user with already used application, the smart phone modifies the component of the UI associated with the shopping application. After modification, the smart phone displays the UI with the modified component of the shopping application as shown in the notation "B" of the FIG. 1, whereas the notation "A" of the FIG. 1 indicates the shopping application with predefined UI. Various detailed examples for optimizing the UI 160 with the modified data item of the new application is illustrated in the FIGS. 5A 5B, 6A to 6C, 7A to 7C, 8A to 8C, 9A to 9C, 10A, and 10B.

Figure 2A:
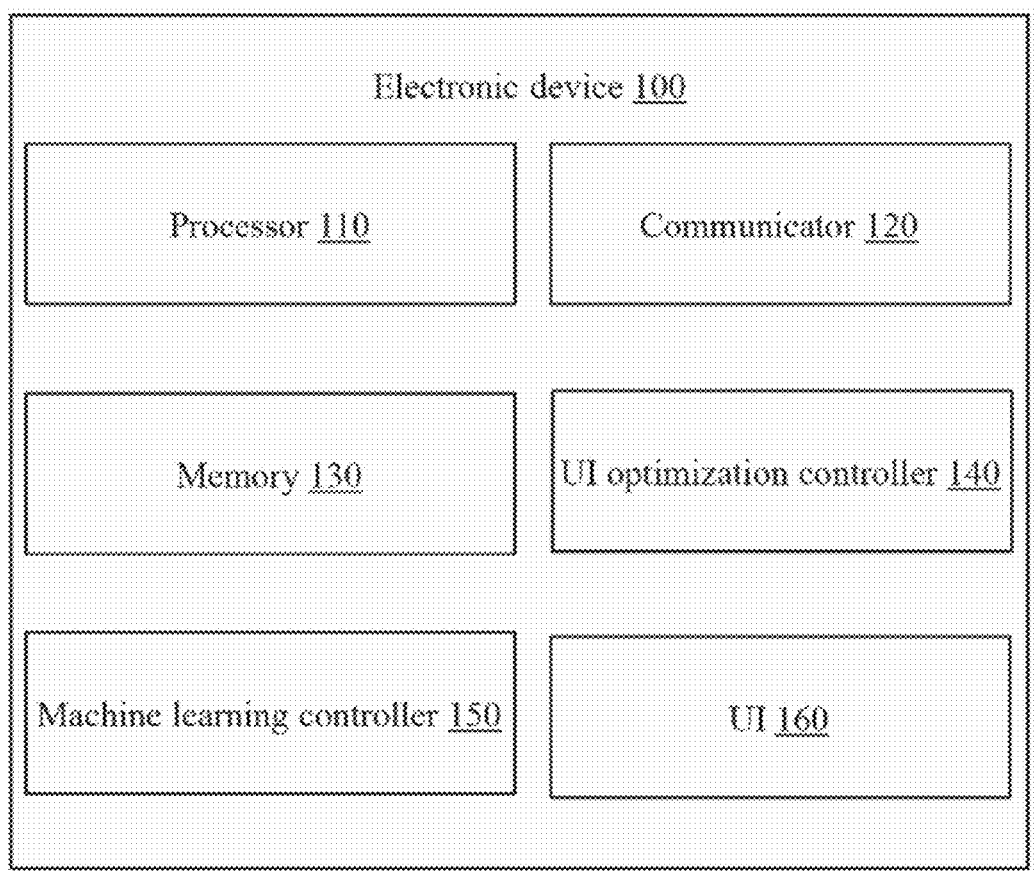
FIG. 2A shows various hardware components of an electronic device, according to an embodiment of the disclosure.

FIG. 2A shows various hardware components of an electronic device, according to an embodiment of the disclosure.

Referring to FIG. 2A, the electronic device 100 includes a processor 110, a communicator 120, a memory 130, a UI optimization controller 140, a machine learning controller 150 and a UI 160. The processor 110 is coupled with the communicator 120, the memory 130, the UI optimization controller 140, the machine learning controller 150 and the UI 160.

In an embodiment, the UI optimization controller 140 is configured to detect the new application installed in the electronic device 100. After detecting the new application installed in the electronic device 100, the UI optimization controller 140 is configured to determine the data item associated with the UI 160 of the new application to be modified. Further, the UI optimization controller 140 is configured to modify the data item associated with the UI 160 of the new application based on the level of proficiency of the user with an already used application in the electronic device 100.

In an embodiment, the UI optimization controller 140 is configured to acquire the level of proficiency of the user with the data item associated with the UI 160 of the already used application in the electronic device 100 using the machine learning model by the ML controller 150. Further, the UI optimization controller 140 is configured to select the data item associated with the UI 160 of the new application based on the level of proficiency of the user with the data item associated with the UI 160 of the already used application in the electronic device 100 using the machine learning model. The data item associated with the UI 160 of the new application is selected by generating the content selection model, the interaction selection model, and the interface selection model based on the level of proficiency of the user with the data item associated with the UI 160 of the already used application in the electronic device 100, and selecting the data item associated with the UI 160 of the new application based on the generated content selection model, the generated interaction selection model, and the generated interface selection model. Further, the UI optimization controller 140 is configured to modify the data item associated with the UI 160 of the new application in response to selecting the data item associated with the UI 160 of the new application.

The content selection model is generated by formatting a dependency tree of the content that allows proper connectivity of words as per grammar of language, performing a syntax analysis, a semantic analysis, a discourse analysis, and a pragmatic analysis on the content, and generating the content selection model based on the syntax analysis, the semantic analysis, the discourse analysis, and the pragmatic analysis on the content. The syntax analysis involves framing the sentence as per grammar of a language. The semantic analysis involves understanding and analyzing a meaning of a sentence understandable to a user of the electronic device 100. The discourse analysis involves checking a context of a previous statement so that coherence of all sentences are maintained. The pragmatic analysis is used to check a sentence for validation as per practical knowledge.

Figure 2B:
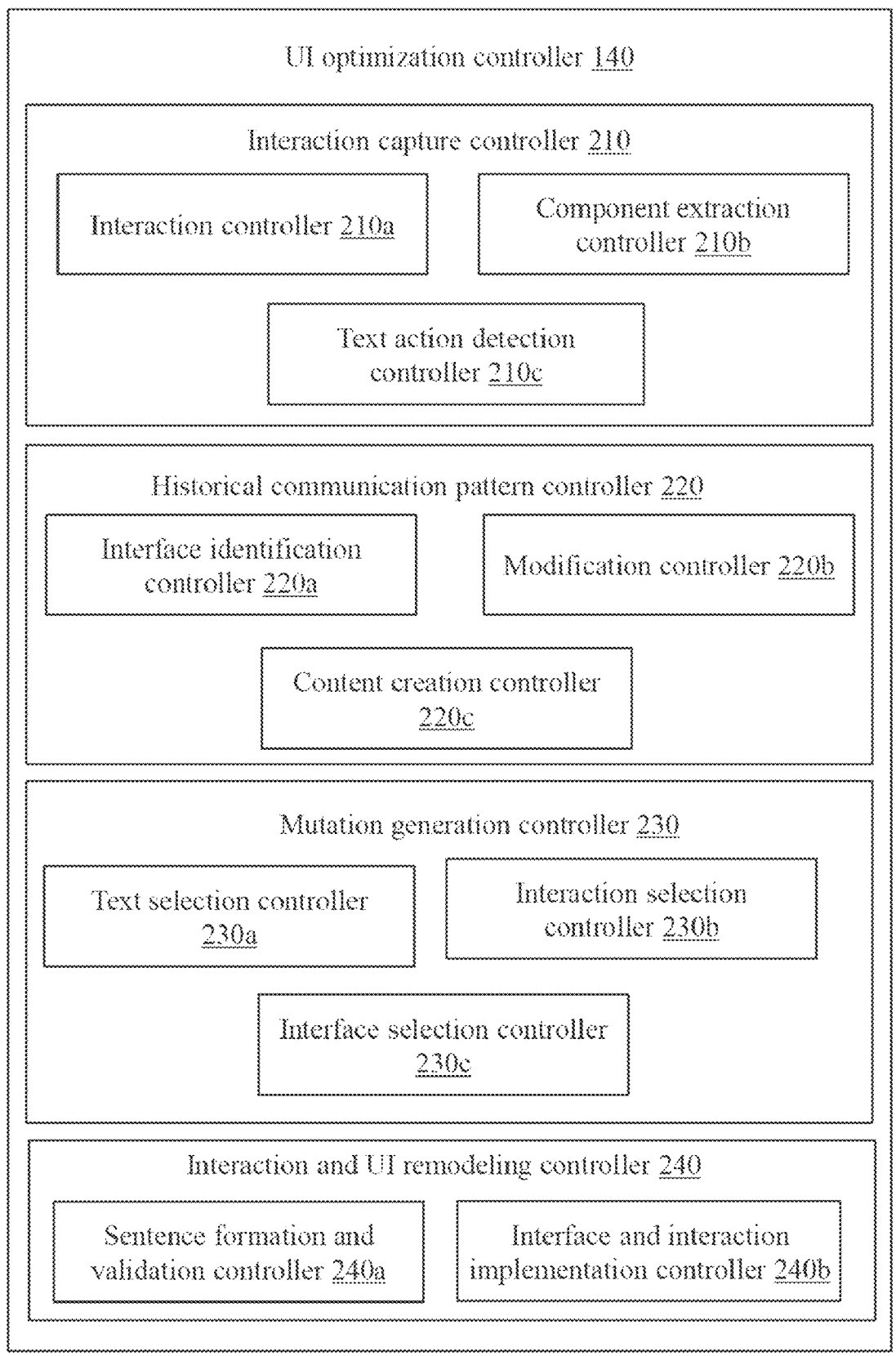
FIG. 2B shows various hardware components of a UI optimization controller of an electronic device, according to an embodiment of the disclosure.

The machine learning controller 150 takes input from the interaction capture controller (e.g., Interaction capture controller 210 as shown in the FIG. 2B) and a historical communication pattern controller (e.g., Historical communication pattern controller 220 as shown in the FIG. 2B) about the interaction/graphical user interface (GUI)/content to calculate the user level of understanding of each component known as proficiency (i.e., content proficiency, GUI proficiency, and interaction proficiency). The artificial intelligence (AI) model works by extracting higher level embedding's for the input fed to it via a pre-trained encoder and decoding the higher level embedding's to obtain multi label outputs for each component/interaction under 3 labels: content, interaction, and interface. Based on scores of these 3 labels, the electronic device 100 proceed to a mutation generation controller 230.

After modifying the data item associated with the UI 160 of the new application, the UI optimization controller 140 is configured to display the UI 160 with the modified data item of the new application.

The processor 110 is configured to execute instructions stored in the memory 130 and perform various processes. The communicator 120 is configured for communicating internally between internal hardware components and with external devices via one or more networks. The memory 130 also stores instructions to be executed by the processor 110. The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory 130 is non-movable. In certain examples, a non-transitory storage medium may store data that can, over time, change (e.g., in Random Access Memory (RAM) or cache).

At least one of the plurality of modules may be implemented through an AI model. A function associated with AI may be performed through the non-volatile memory, the volatile memory, and the processor.

The processor 110 may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

Here, being provided through learning means that, by applying a learning algorithm to a plurality of learning data, a predefined operating rule or AI model of a desired characteristic is made. The learning may be performed in a device itself in which AI according to an embodiment is performed, and/o may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although the FIG. 2A shows various hardware components of the electronic device 100 but it is to be understood that other embodiments are not limited thereon. In other embodiments, the electronic device 100 may include less or more number of components. Further, the labels or names of the components are used only for illustrative purpose and does not limit the scope of the disclosure. One or more components can be combined together to perform same or substantially similar function to optimize the UI 160 of the application in the electronic device 100.

FIG. 2B shows various hardware components of a UI optimization controller of an electronic device, according to an embodiment of the disclosure.

Referring to FIG. 2B, a UI optimization controller 140 includes an interaction capture controller 210, a historical communication pattern controller 220, a mutation generation controller 230, and an interaction and UI remodelling controller 240.

The interaction capture controller 210 will learn the user interaction with the UI and content (e.g., visual information of UI, the interaction on the UI and a function corresponding to the UI) using and store that information of the user in the memory 130 using the historical communication pattern controller 220. In an example, the user of the electronic device 100 frequently uses a single tap or double tap on the installed application but rarely uses a swipe functionality on the already used application. The stored information will be used by the ML controller 150 which is trained to calculate the proficiency of user in terms of content, the UI, and the interaction with the UI 160. In an example, hence proficiency of the user is high for the single touch and low for swipe etc. Further, when the user of the electronic device 100 installs the new application, then the mutation generation controller 230 obtains the UI information and function information of the new application. In an example, the new application supports the swipe functionality in most of its activities. Further, the interaction and UI remodeling controller 240 will analyze the function information of the new application using the mutation generation controller 230 based on the stored function information. This will help in checking proficiency of the user with respect to the GUI/UI/interaction supported by the new application. In an example, the proficiency of user is low in respect to swipe functionality. If the GUI components of the new application does not match with the proficiency of the already used application, then the interaction and UI remodeling controller 240 will alter the GUI/UI/Functions of the new application with the respective matching proficiency components using the mutation generation controller 230 to improve the usability. In an example, the swipe functionality will be replaced with single button tap functionality.

The interaction capture controller 210 includes an interaction controller 210a, a component extraction controller 210b, and a text action detection controller 210c. The interaction controller 210a identifies and captures interaction with respect to the UI components. The component extraction controller 210b gathers information about all UI component. The text action detection controller 210c detects user's gestures and actions performed on any component using a parameter. The parameter can be, for example, but not limited to a type of a UI component, a number of the UI component, a UI component identifier, and a UI component parameter.

The historical communication pattern controller 220 includes an interface identification controller 220a, a modification controller 220b, and a content creation controller 220c. The interface identification controller 220a checks for the user action of application switch to trigger the trip characteristic behavior identification. The modification controller 220b identifies any modification in content and user action. The content creation controller 220c checks for the user action of the content creation on the application.

The mutation generation controller 230 includes a text selection controller 230a, an interaction selection controller 230b and an interface selection controller 230c. The text selection controller 230a selects the text based on the user's proficiency. The interaction selection controller 230b selects the interaction based on the user's proficiency. The interface selection controller 230c selects the interface based on the user's proficiency. The text selection controller 230a, the interaction selection controller 230b and the interface selection controller 230c are operated by using a long short-term memory (LSTM) based language model and a neural multiclass classifier. The LSTM based language model is trained for user's proficiency.

The interaction and UI remodelling controller 240 includes a sentence formation and validation controller 240a and an interface and interaction implementation controller 240b. The sentence formation and validation controller 240a performs the syntax analysis, the semantic analysis, the discourse analysis and the pragmatic analysis. The interface and interaction implementation controller 240b implements the modified/updated interface and modified/updated interaction on the application. The syntax analysis involves framing the sentence as per grammar of a language. The semantic analysis involves understanding and analyzing a meaning of a sentence understandable to a user of the electronic device 100. The discourse analysis involves checking a context of previous statement so that coherence of all sentences are maintained. The pragmatic analysis is used to check a sentence for validation as per practical knowledge.

After modifying the data item associated with the UI 160 of the new application, the interaction and UI remodelling controller 240 is configured to display the UI 160 with the modified data item of the new application.

Although the FIG. 2B shows various hardware components of the UI optimization controller 140 but it is to be understood that other embodiments are not limited thereon. In other embodiments, the UI optimization controller 140 may include less or more number of components. Further, the labels or names of the components are used only for illustrative purpose and does not limit the scope of the disclosure. One or more components can be combined together to perform same or substantially similar function to optimize the UI 160 of the application in the electronic device 100.

Figure 3:
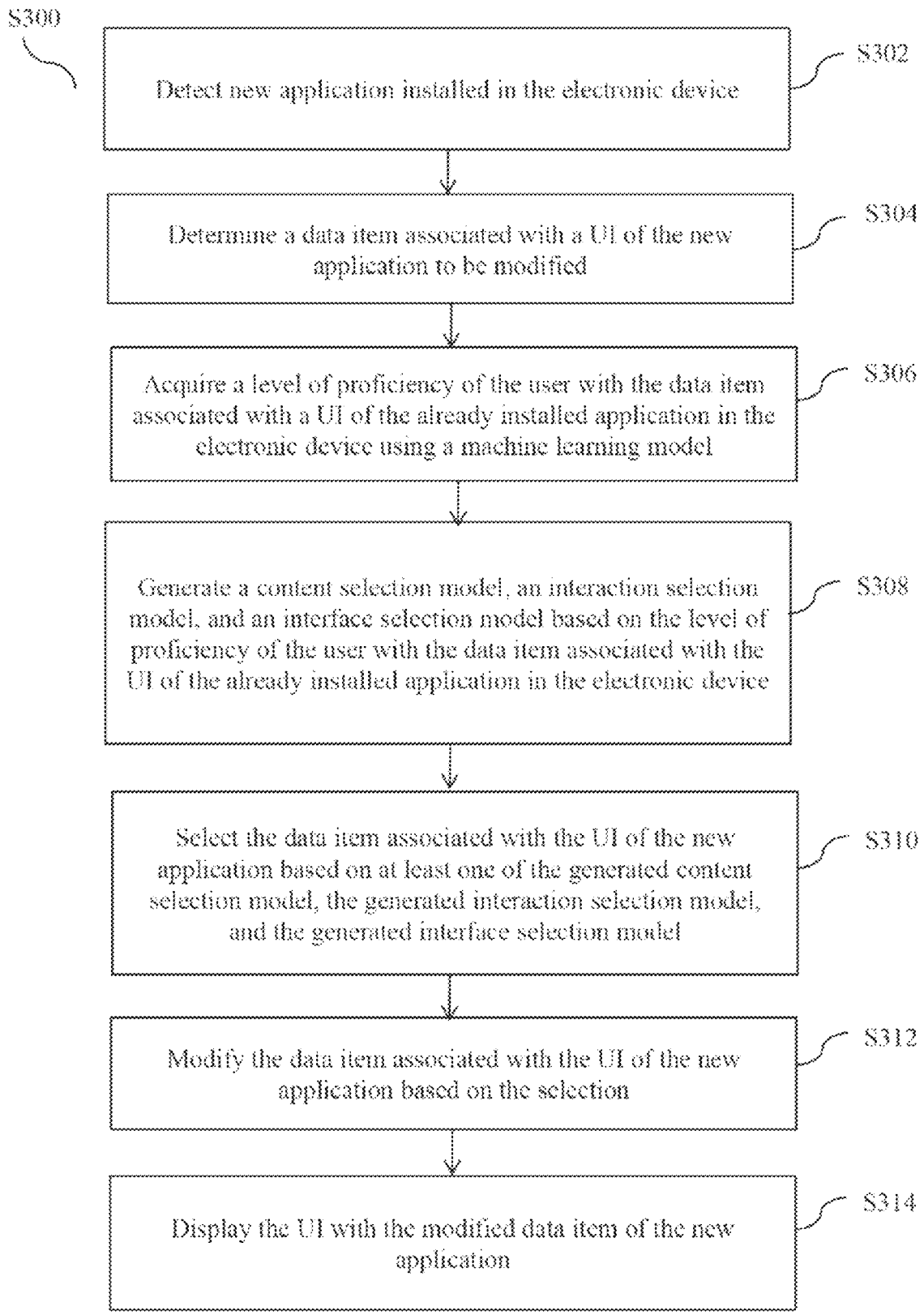
FIG. 3 is a flow chart illustrating a method for optimizing a UI of an application in an electronic device, according to an embodiment of the disclosure.

FIG. 3 is a flow chart illustrating a method for optimizing a UI of an application in an electronic device, according to an embodiment of the disclosure.

Referring to FIG. 3, the operations of flow chart S300 (i.e., S302, S304, S306, S308, S310, S312, and S314) are performed by a UI optimization controller 140. At S302, the method includes detecting the new application installed in the electronic device 100. At S304, the method includes determining the data item associated with the UI 160 of the new application to be modified. At S306, the method includes acquiring the level of proficiency of the user with the data item associated with the UI of the already used application in the electronic device 100 using the machine learning model. At S308, the method includes generating the content selection model, the interaction selection model, and the interface selection model based on the level of proficiency of the user with the data item associated with the UI 160 of the already used application in the electronic device 100. At S310, the method includes selecting the data item associated with the UI 160 of the new application based on the generated content selection model, the generated interaction selection model, and the generated interface selection model. At S312, the method includes modifying the data item associated with the UI of the new application based on the selection. At S314, the method includes displaying the UI 160 with the modified data item of the new application.

The various actions, acts, blocks, operations, or the like in the flow chart S300 may be performed in the order presented, in a different order or simultaneously. Further, in some embodiments, some of the actions, acts, blocks, operations, or the like may be omitted, added, modified, skipped, or the like without departing from the scope of the disclosure.

Figure 4A:
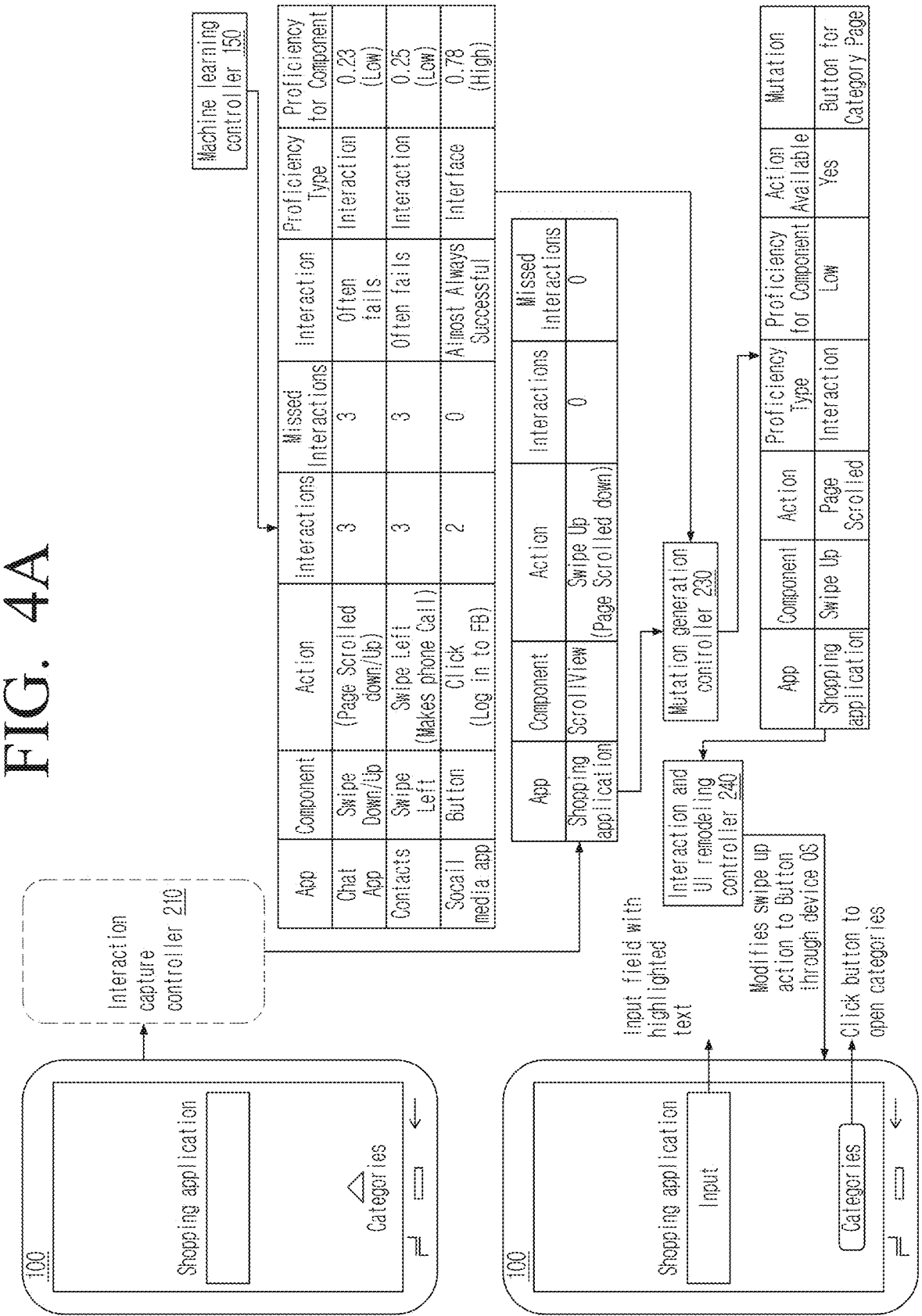
FIG. 4A illustrates an example scenario in which step by step operations are illustrated for optimizing a UI of an application, according to an embodiment of the disclosure.

FIG. 4A illustrates an example scenario in which step by step operations are illustrated for optimizing a UI of an application, according to an embodiment as disclosed herein.

Referring to FIG. 4A, an electronic device 100 learns the functionality of user behavior from the previous installed applications. The electronic device 100 determines the similarity functionality for the new application based on the previous learning. The electronic device 100 determine the similarity between the function of the new application and the function of the previously used application. Based on the determined similarity, the electronic device 100 determines the best interaction type (e.g., GUI/touch gesture) and accordingly, modifies the data item of the new application.

Consider, the electronic device 100 contains multiple pre-loaded applications and user of the electronic device 100 interacts with all application using various function (e.g., zoom-in/out, sliding, scrolling up/down, a single tap, double tab hold actions on various image content, video content, and documents. The electronic device 100 captures and stores the GUI/interaction information (e.g., touch activities such as pinch zoom, swipe, sliding, tap, scroll, gestures for a current application running in the electronic device 100 and for a respective feature control such as zoom-in, zoom-out in gallery, pdf viewer, Microsoft Word, etc.) of user over the time pre-loaded applications using the interaction capture controller 210. The GUI/interaction information from the pre-loaded applications with a respective feature will be processed to know a user historical communication pattern (HCP) using the historical communication pattern controller 220. The HCP includes interaction with various applications using the interaction components (e.g., zoom-in and zoom-out, etc.). The HCP patterns identifies real time user's GUI behavior/interaction.

Further, the ML controller 150 classifies (using the HCP) that user's proficiency vector with the electronic device 100. Further, the mutation generation controller 230 identifies the GUI/interaction problem with new application and predicts best available solution (for the text, interface, and interaction) based on user's proficiency vector. Further, when the new application is opened, interaction and UI remodelling controller 240 extracts UI components (e.g., text, interaction, function, etc.) and matches the components with the HCP to understand problematic UI components. Based on the matching, the interaction and UI remodelling controller 240 reconfigures the new components on the application.

Figure 4B:
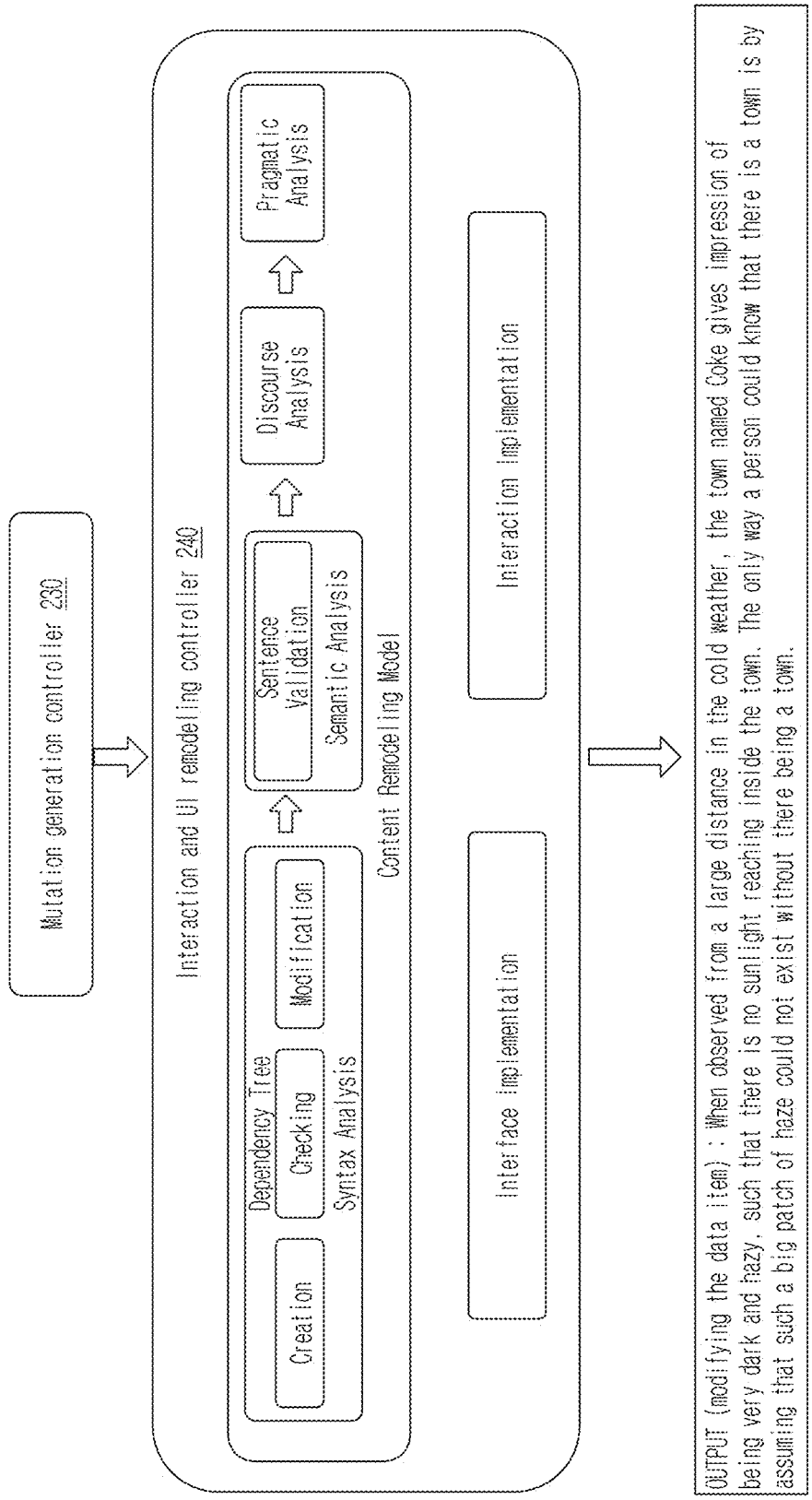
FIG. 4B is an example illustration in which an interaction and UI remodeling controller gets output of changes from a mutation generation controller and intelligently incorporates into a UI and text components, according to an embodiment of the disclosure.

FIG. 4B is an example illustration in which an interaction and UI remodeling controller 240 gets output of changes from a mutation generation controller 230 and intelligently incorporates into a UI and text components, according to an embodiment of the disclosure.

Referring to FIG. 4B, an interaction and UI remodeling controller 240 continuously trains a content remodeling model. The content remodeling model will check and configure the syntax analysis, semantic analysis, discourse analysis, and pragmatic analysis. The dependency tree is a formalism that allows proper connectivity of words as per grammar of language. The syntax analysis involves framing the sentence as per grammar of the language. The semantic analysis involves understanding and analyzing the meaning of a sentence understandable to a human. The discourse analysis involves checking the context of previous statement so that coherence of all sentences can be maintained. In the pragmatic analysis, the sentence is checked for validation as per practical knowledge used in real world. The interaction and UI remodeling controller 240 modifies the interface and interaction elements based on the input from the mutation generation controller 230.

Figure 4C:
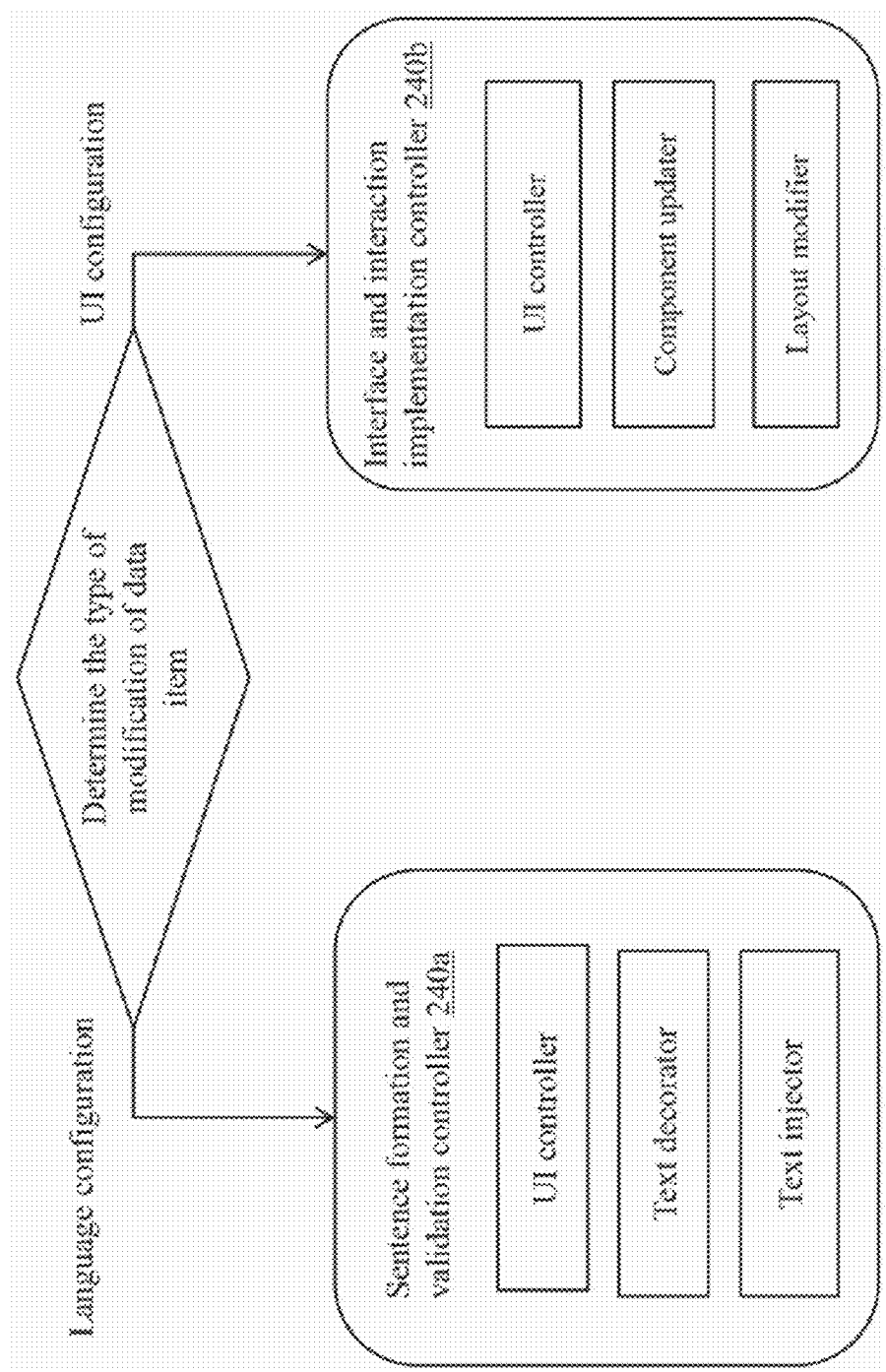
FIG. 4C is an example flow diagram illustrating a method for modifying a data item associated with a UI of an application based on a level of proficiency of a user with an already used application in the electronic device, according to an embodiment of the disclosure.

FIG. 4C is an example flow diagram illustrating a method for modifying a data item associated with a UI of an application based on a level of proficiency of a user with an already used application in an electronic device, according to an embodiment of the disclosure.

Referring to FIG. 4C, an electronic device 100 determines the type of modification of the data item. If the modification corresponds to the UI configuration then, the interface and interaction implementation controller 240*b* will take care all operations corresponding to modifying the data item. In an example, the UI controller provides control of UI component (e.g., TextView, ListItem or the like). The component updater selects updates to be done on the data item (in an example, change gesture listener). The layout modifier applies modification in the layout (in an example, adds function on long tap and delete from left swipe). If the modification corresponds to the language configuration then, the sentence formation and validation controller 240*a* will take care of all operations corresponding to modifying the language. In an example, the UI controller provides control of UI component (e.g., TextView, ListItem or the like). The text decorator applies decoration on text (e.g., text size, text color, font type etc.). The text injector sets decorated text to TextView control.

Figure 5A:
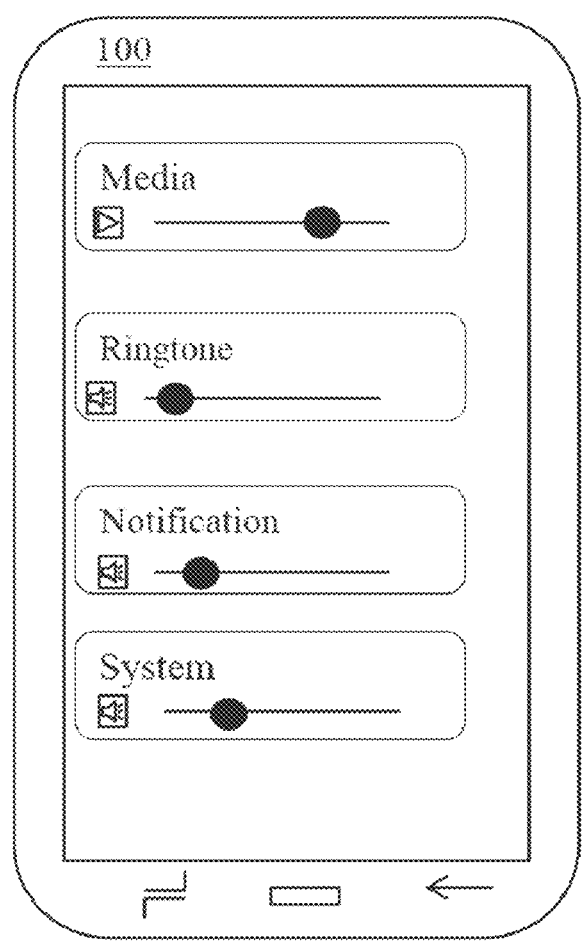
FIGS. 5A and 5B illustrate example scenarios in which an electronic device optimizes a UI of a volume application, according to various embodiments of the disclosure.
Figure 5B:
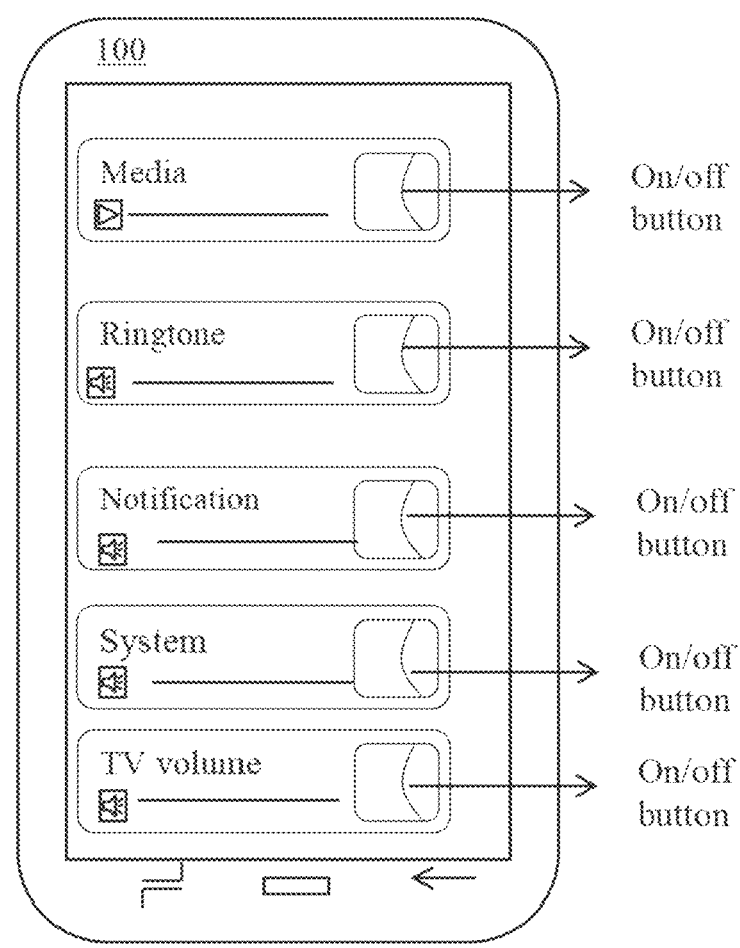

FIGS. 5A and 5B illustrate example scenarios in which an electronic device optimizes a volume option on a UI, according to various embodiments of the disclosure.

Referring to FIG. 5A, a default UI of a volume option is depicted. Based on the proposed method, the interaction capture controller 210 identified user's problem (i.e., operating TV/Phone volume while paired with TV). The historical communication pattern controller 220 identified user interaction of lowering volume and AI model provided user proficiency vector. The mutation generation controller 230 generated new UI element for TV volume separately. The interaction and UI remodelling controller 240 added TV volume UI element to the current volume panel when TV is connected as shown in the FIG. 5B.

Referring to FIG. 5B, a smart phone sends a smart view request to a smart TV to establish screen sharing communication using a Wireless fidelity (Wi-Fi) direct. The smart view request includes device identification (ID), and configuration information. The TV detects the incoming smart view request and identifies device (using the ID) and in response to that initiates session request (i.e. Bluetooth/Wi-Fi channelization) and ask for authentication. The user of the smart phone confirms the request and get paired with the TV. The session established here is for media streaming only. That involve casting of audio and video to TV from the smart phone. Further, when the user of the smart phone performs volume rocker key (hardware button) in the smart phone up/down for controlling TV volume. Practically, in this step volume of media content transferred from the smart phone is controlled and not actually TV speaker volume is controlled.

Based on the proposed methods, interaction capture controller 210 in the smart phone captures and store user interaction information (e.g., touch activities such as swipe, sliding, tap, scroll, use of hardware button such as rocker key—up/down for different application running in the smart phone and for respective feature control such as volume of music player) of user over the time, meanwhile user interaction with the smart TV volume up/down captured by the interaction capture controller 210 running at the smart TV end. The interaction information from the smart phone and the smart TV are processed to know the historical communication pattern of the user using the historical communication pattern controller 220. The HCP includes below information current HCP at the smart phone end: Interaction with volume key, missed key press event (unwanted), searching TV volume feature availability in the smart phone, and current HCP at the TV end: Interaction with volume up/down. The historical communication pattern controller 220 collectively identifies real time user behavior/interaction (e.g., TV volume up by phone rocker up Key). The ML controller 150 classifies (using the HCP) that user's proficiency vector with TV/mobile for volume control. In an example, for the smart phone—Text Proficiency—High (understanding smart view in phone), UI Interaction proficiency—Low (using hard key to volume control of TV via Phone), and for the TV, Text Proficiency—(N/A), UI Interaction proficiency—High (using remote key to volume control of TV).

Further, the mutation generation controller 230 identifies the real user problem and predicts a best available solution based on a user's proficiency vector. In an example, for the phone—Interface Selection (UI Component): Since there is no TV volume controller in the smart phone, new interface element (UI Component) of TV Volume controller is suggested on mobile, Phone—Interaction selection (UI Component function): Low interaction proficiency with hard volume keys, hence UI Component with volume seek bar functionality is suggested, TV—Based on Proficiency vector (since it is High) there is no need for new Interface and Interaction Selection on TV. In the last phase, a reconfiguration of UI component from old to new is done. Where the UI component presented and included with a sliding seek bar associated with controller for recognizing sliding input for volume control of TV. This TV volume seek bar (UI component+function) added in phone volume seek bar panel, when the phone is connected with TV using the smart view. Further, on/off button is also provided for controlling various volumes of the UI.

Figure 6A:
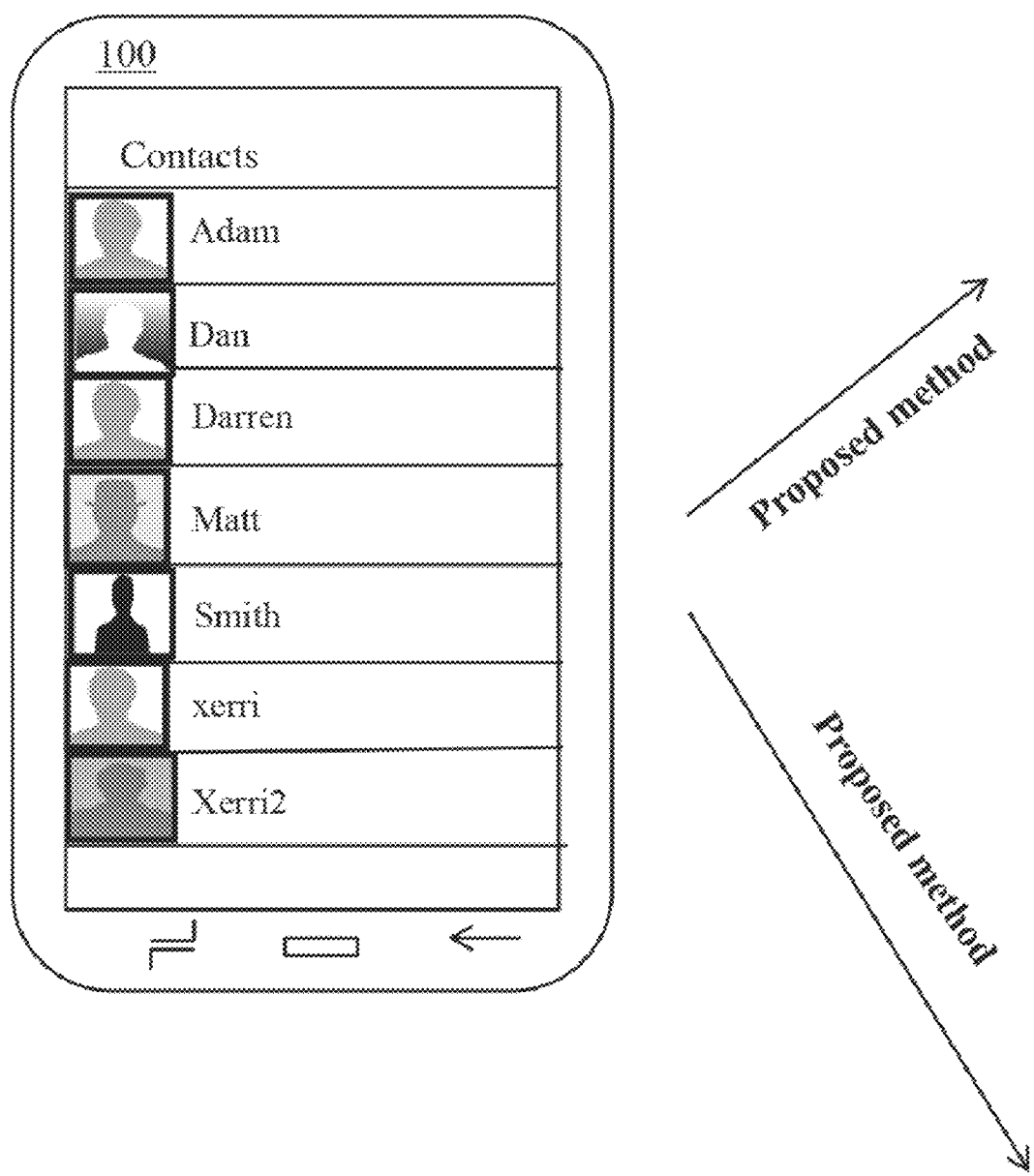
FIGS. 6A, 6B, and 6C illustrate example scenarios in which an electronic device optimizes a UI of a contact application, according to various embodiments of the disclosure.
Figure 6B:
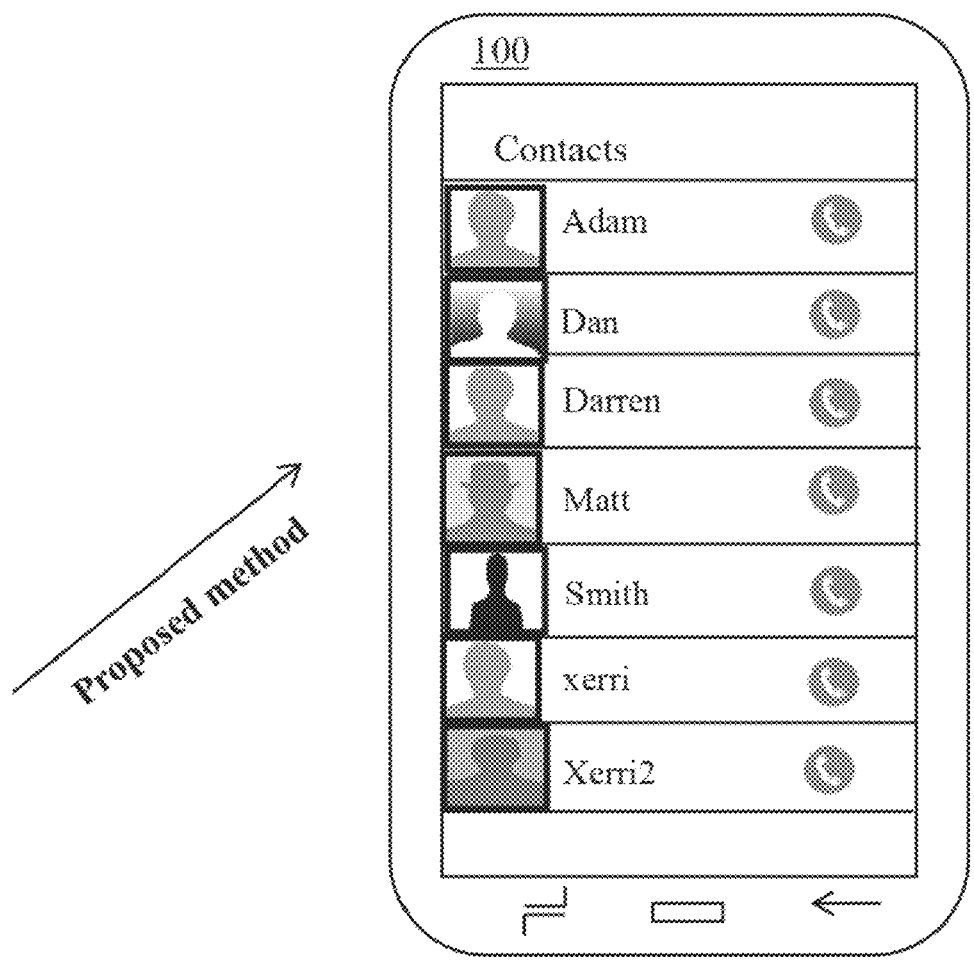
Figure 6C:
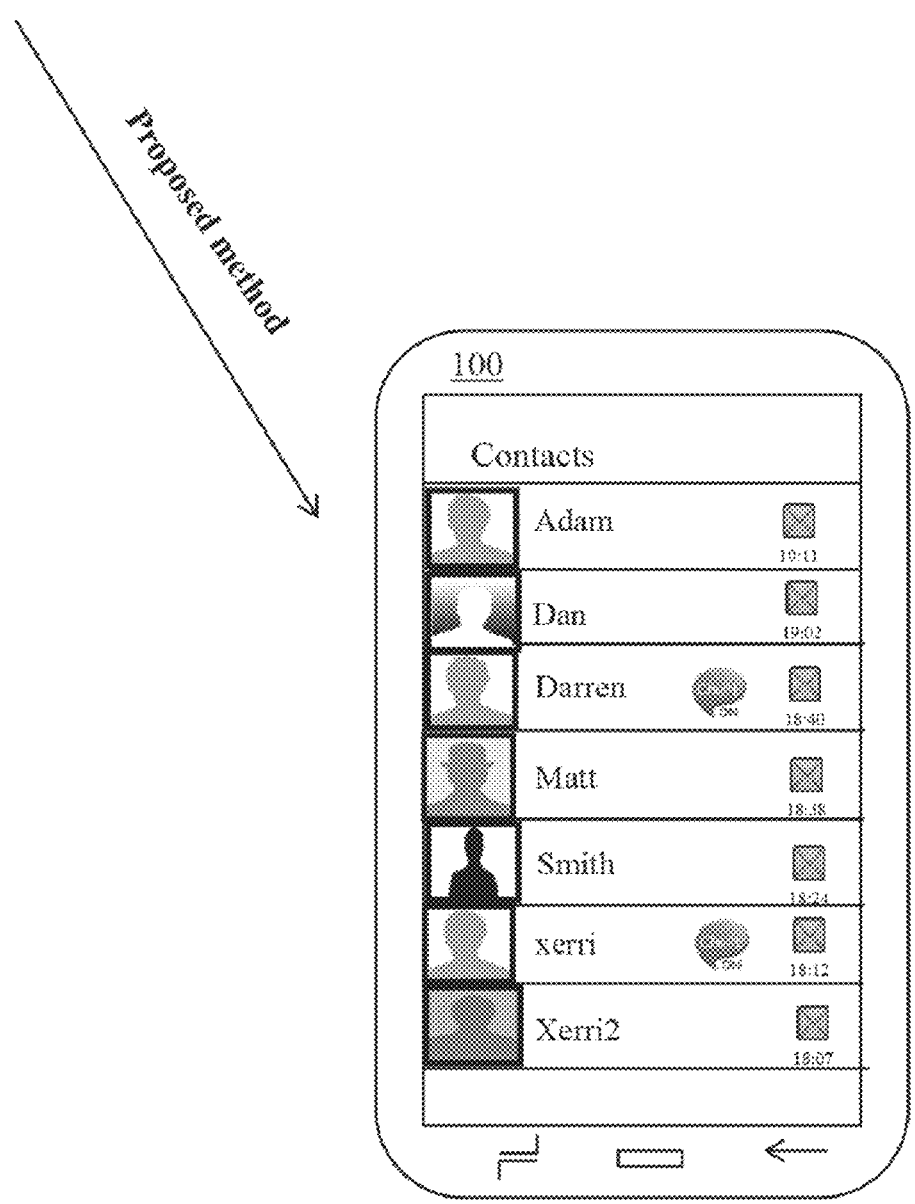

FIGS. 6A, 6B, and 6C illustrate example scenarios in which an electronic device optimizes a UI of a contact application, according to various embodiments of the disclosure.

Referring to FIG. 6A, a default UI of a contact application is depicted.

Referring to FIGS. 6B and 6C, an electronic device 100 contains multiple pre-loaded applications and a user of an electronic device 100 interacts with an application using various functions (e.g., zoom-in/out, sliding, scrolling, tap, double tab hold actions on various image contents, video contents, and the documents). The electronic device 100 captures and stores the GUI/interaction information (e.g., touch activities such as pinch zoom, swipe, sliding, tap, scroll, gestures for current installed application running in the electronic device 100 and for respective feature control such as zoom-in, zoom-out in gallery, pdf viewer, etc.) of user over the time pre-loaded applications. The GUI/interaction information from the pre-loaded applications with a respective feature will be processed to know the user HCP. The HCP includes interaction with the contact application for using the contact application.

Further, the HCP controller 220 identifies real time user's GUI behavior/interaction (e.g., swipe function on the contact application) and that the user is unable to use left and right swipe feature frequently on the contact application and the user is comfortable in a click button. The ML controller 150 classifies (using the HCP controller) that user's proficiency vector with the electronic device 100 for the call functionality. The mutation generation controller 230 identifies the GUI/Interaction problem with the new contact application and predicts a best available solution (e.g., text, interface, and interaction on the contact application) based on the user's proficiency vector. In an example, there is no direct call component and direct message component available on the contact application, so the electronic device 100 will suggest the direct call component and the direct message component on the contact application in the form of single click button. Based on the suggestion, interaction and UI remodeling controller 240 modifies the contact application with the direct call component and the direct message component on the contact application in the form of single click button. This results in enhancing the user experience.

Referring to FIG. 6C, similar to the FIG. 6B, an electronic device 100 modifies a contact application with an email client component and a direct chat component on a contact application.

Figure 7A:
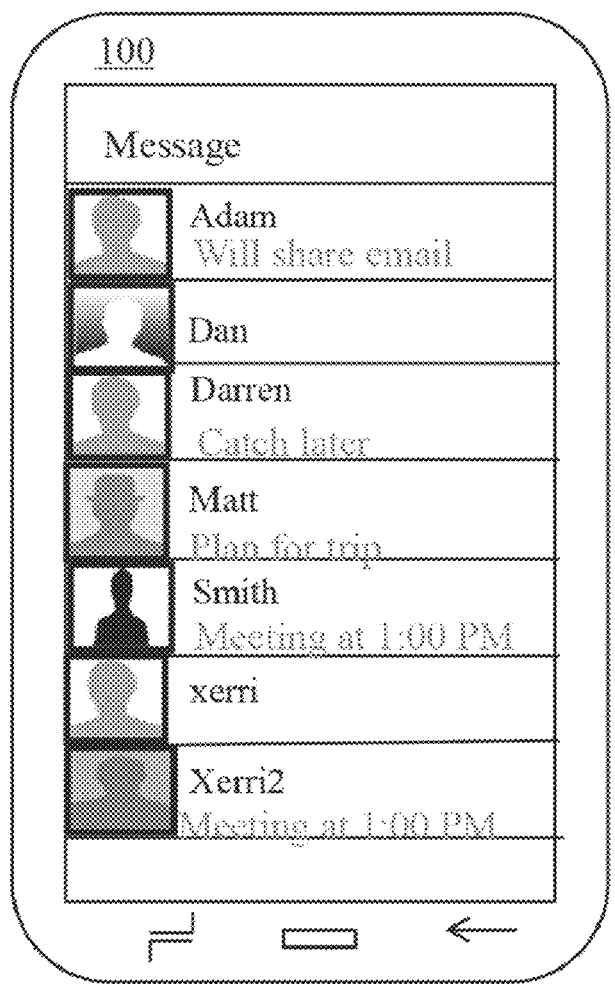
FIGS. 7A, 7B, and 7C illustrate example scenarios in which an electronic device optimizes a UI of a message application, according to various embodiments of the disclosure.
Figure 7B:
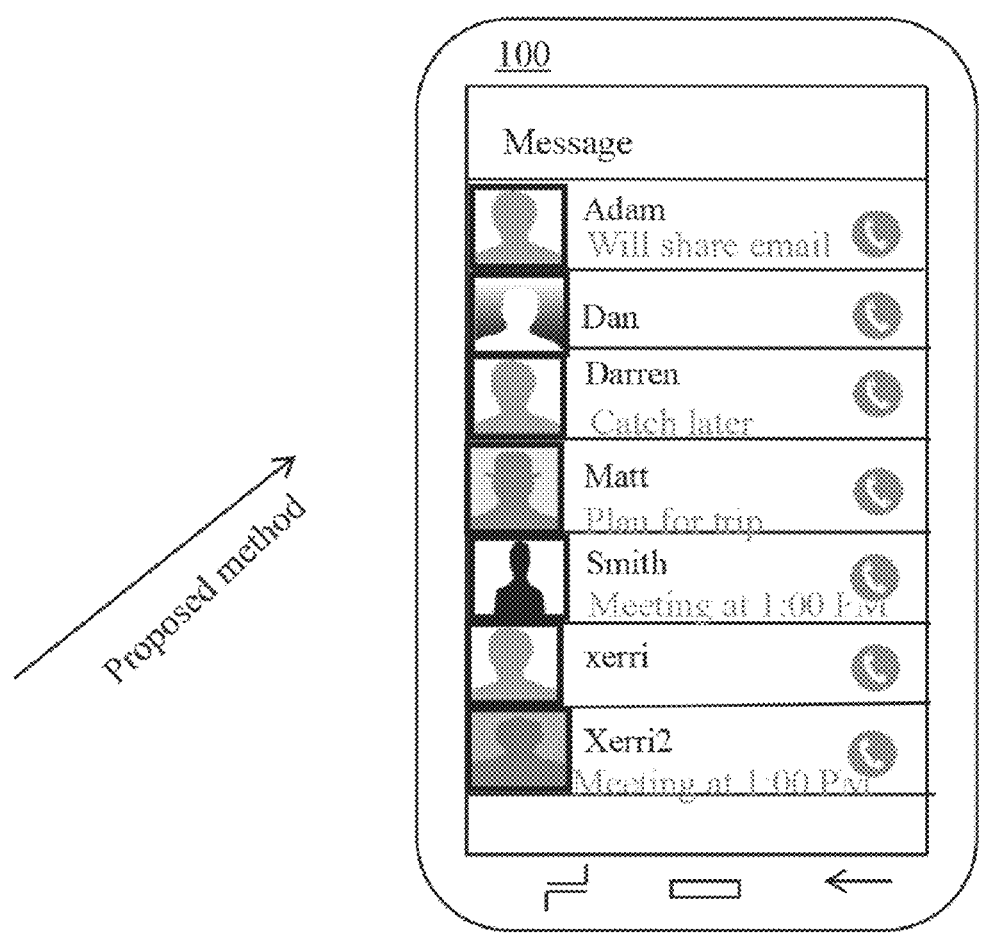
Figure 7C:
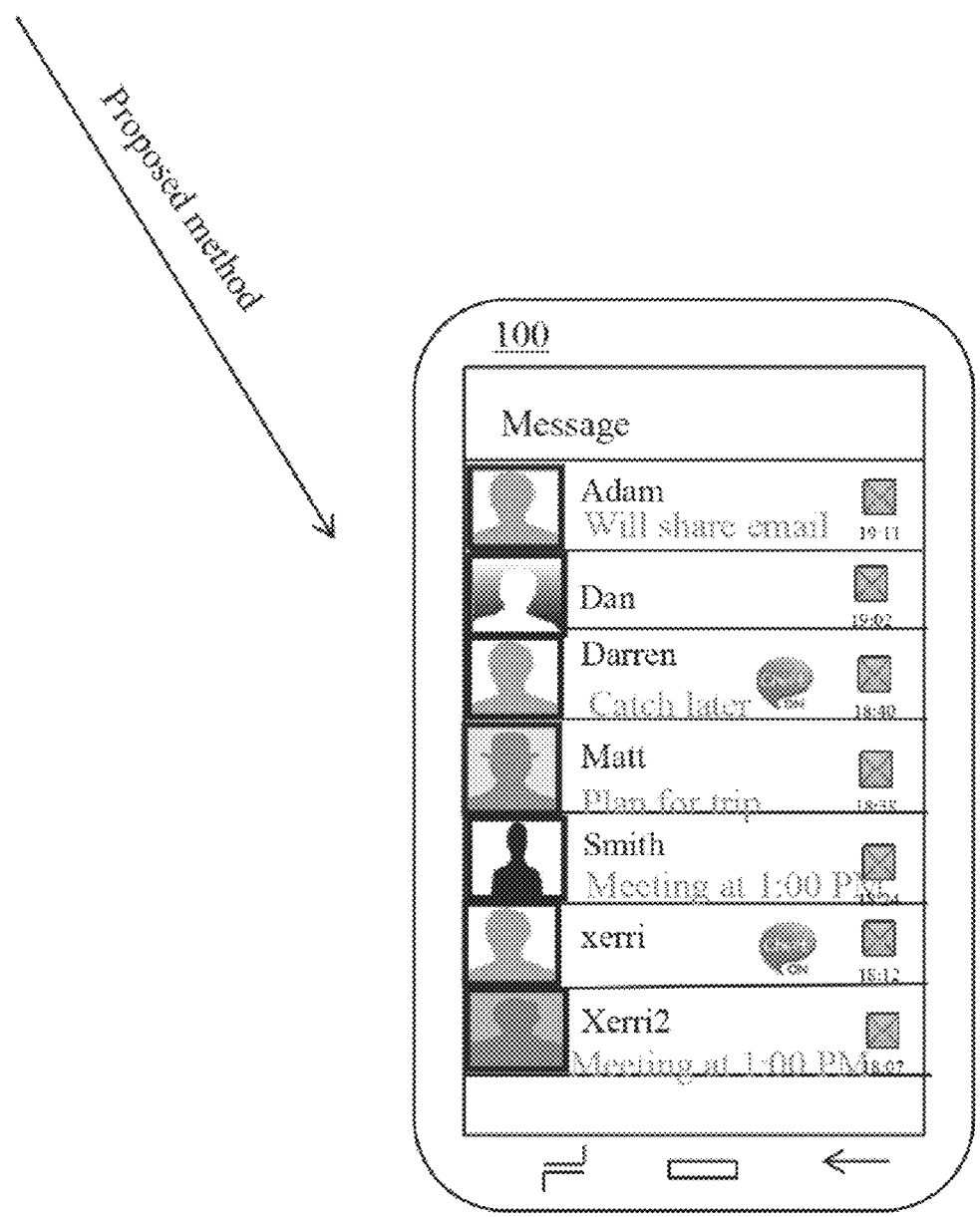

FIGS. 7A, 7B, and 7C illustrate example scenarios in which an electronic device optimizes a UI of a message application, according to various embodiments of the disclosure.

Referring to FIG. 7A, a default UI of a message application is depicted.

Referring to FIG. 7B, similar to the FIGS. 6B and 6C, an electronic device 100 modifies a message application with a call component on a message application.

Referring to FIG. 7C, similar to the FIGS. 6B and 6C, an electronic device 100 modifies a message application with an email client component and a direct chat component on a contact application.

Figure 8A:
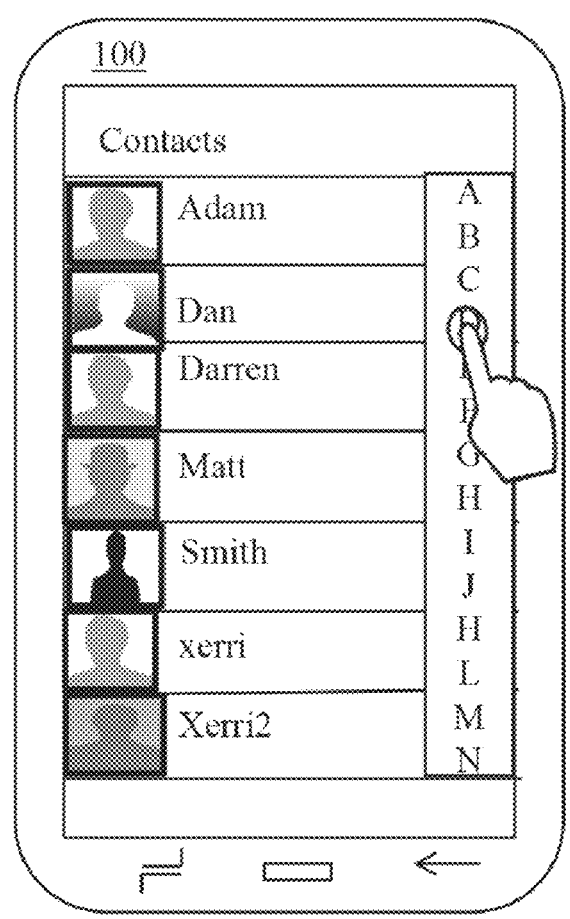
FIGS. 8A, 8B, and 8C illustrate example scenarios in which an electronic device optimizes a UI of a contact application, according to various embodiments of the disclosure.
Figure 8B:
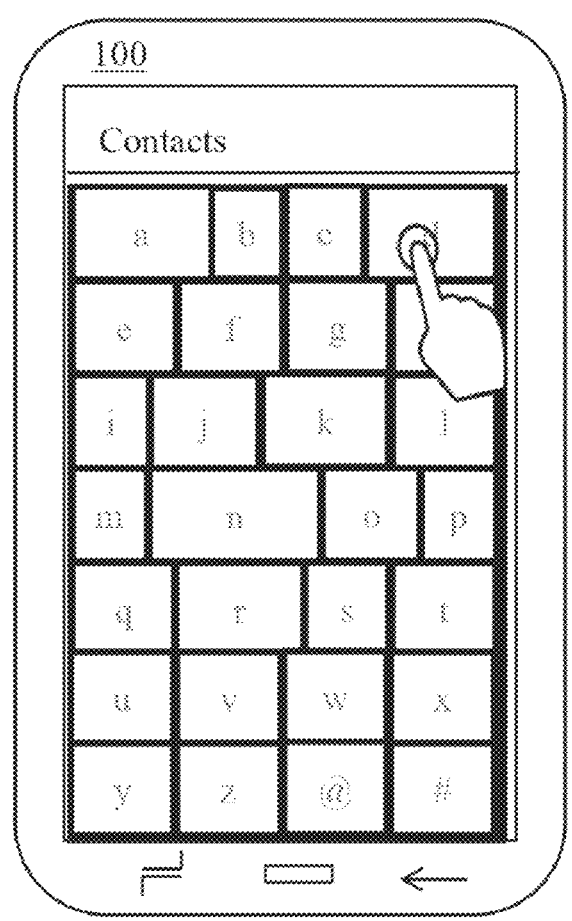
Figure 8C:
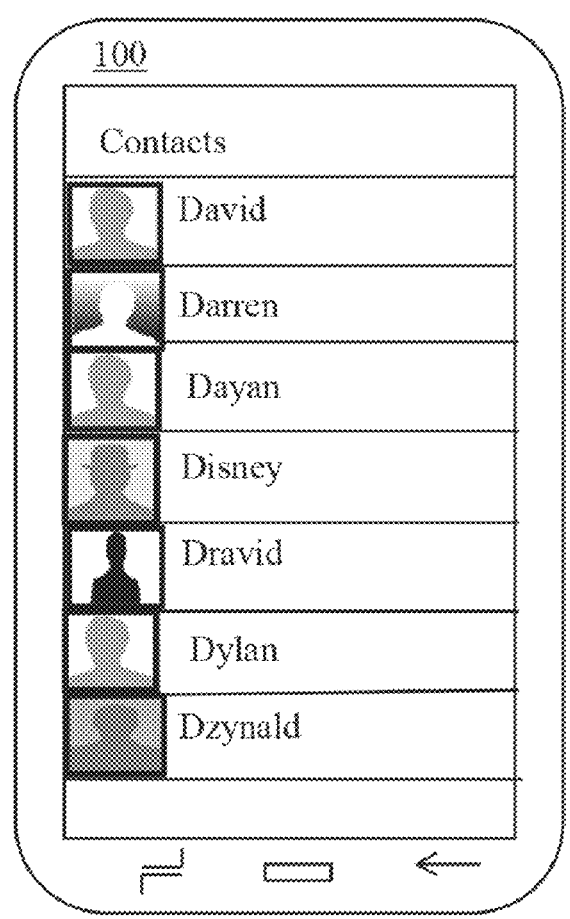

FIGS. 8A, 8B, and 8C illustrate example scenarios in which an electronic device optimizes a UI of a contact application, according to various embodiments of the disclosure.

Referring to FIG. 8A, a default UI of a contact application is depicted.

Referring to FIGS. 8B and 8C, an electronic device 100 contains multiple pre-loaded applications and a user of an electronic device 100 interacts with applications using various function (e.g., zoom-in/out, sliding, scrolling up/down, tap, double tab hold actions on various applications). The electronic device 100 captures and stores the GUI/interaction information (e.g., touch activities such as pinch zoom, swipe, sliding, tap, scroll, gestures for the current installed application running in the electronic device 100 and for respective feature control such as zoom-in, zoom-out, swipe up, swipe down of the user over the time for the pre-installed applications. The GUI/interaction information from the pre-installed applications with respective feature will be processed to know the user HCP. The HCP includes interaction with the contact application for using the contact application. The HCP controller 220 identifies real time user's GUI behavior/interaction (e.g., swipe function on the contact application) and that the user is unable to use up and down swipe feature frequently on the contact application and the user is comfortable use in a click button in the form of grid view. The ML controller 150 classifies (using the HCP controller 220) that user's proficiency vector with the electronic device 100 for the call functionality. The mutation generation controller 230 identifies the GUI/interaction problem with the new contact application and predicts a best available solution (e.g., text, interface, and interaction on the contact application) based on the user's proficiency vector. Based on the prediction, the interaction and UI remodeling controller 240 modifies the contact application with a grid size of an alphabet based on a number of contacts starting from each letter of that alphabet. This results in enhancing the user experience.

Figure 9A:
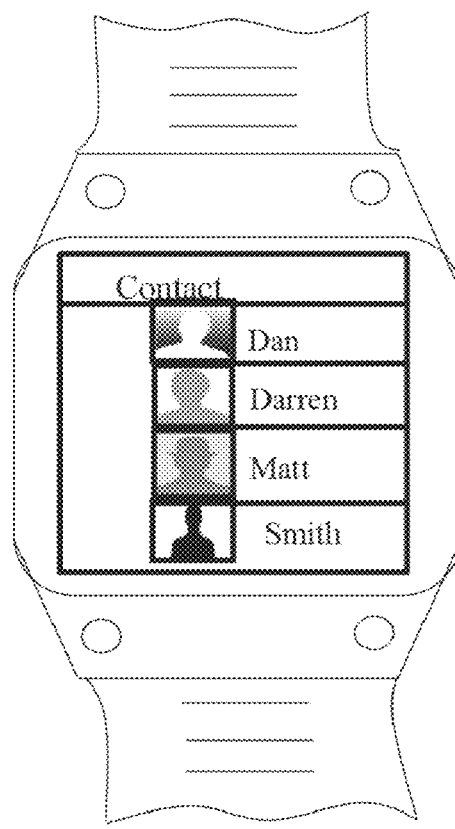
FIGS. 9A, 9B, and 9C illustrate example scenarios in which a smart watch optimizes a UI of a contact application, according to various embodiments of the disclosure.
Figure 9B:
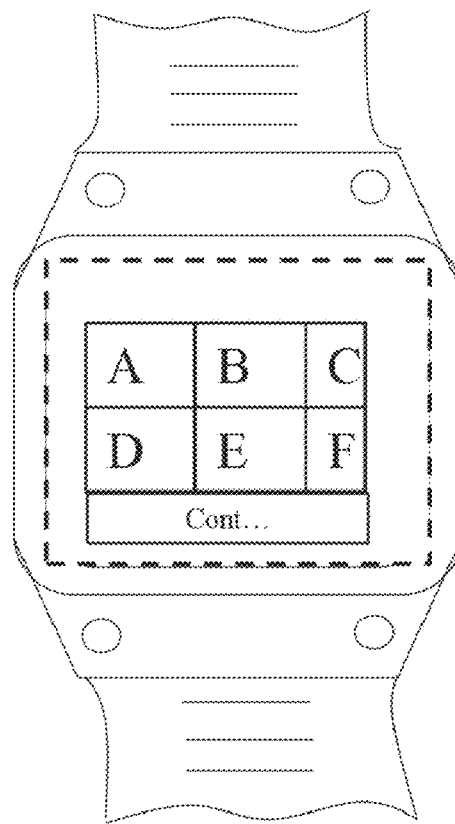
Figure 9C:
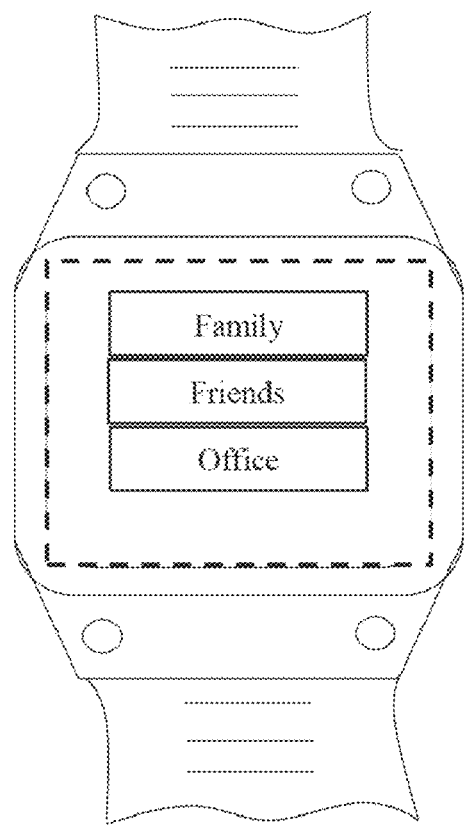

FIGS. 9A, 9B, and 9C illustrate example scenarios in which a smart watch optimizes a UI of a contact application, according to various embodiments of the disclosure.

Referring to FIG. 9A, a default UI of a contact application is depicted.

Referring to FIGS. 9B and 9C, a smart watch contains multiple pre-loaded applications and a user of a smart watch interacts with applications using various functions (e.g., zoom-in/out, sliding, scrolling up/down, tap, and double tab hold actions on various applications). The smart watch captures and stores the GUI/interaction information (e.g., touch activities such as pinch zoom, swipe, sliding, tap, scroll, gestures for the current installed application running in the smart watch and for respective feature controls such as zoom-in, zoom-out, swipe up, swipe down) of the user over the time for the pre-installed applications. The GUI/interaction information from the pre-installed applications with a respective feature will be processed to know the user HCP. The HCP includes interaction with the contact application for using the contact application. The HCP controller 220 identifies real time user's GUI behavior/interaction (e.g., swipe function on the contact application) and that the user is unable to use up and down swipe feature frequently on the contact application and the user is comfortable use in a click button in the form of grid view.

The ML controller 150 classifies (using the HCP controller 220) that user's proficiency vector with the smart watch for the call functionality. The mutation generation controller 230 identifies the GUI/interaction problem with the new contact application and predicts a best available solution (e.g., text, interface, and interaction on the contact application) based on the user's proficiency vector. Based on the prediction, the interaction and UI remodeling controller 240 modifies the contact application with an alphabet mode and a category mode. The double tab on center will move to next alphabet order. The alphabet mode and the category mode enhances a touch area for better interaction. This results in enhancing the user experience.

Figure 10B:
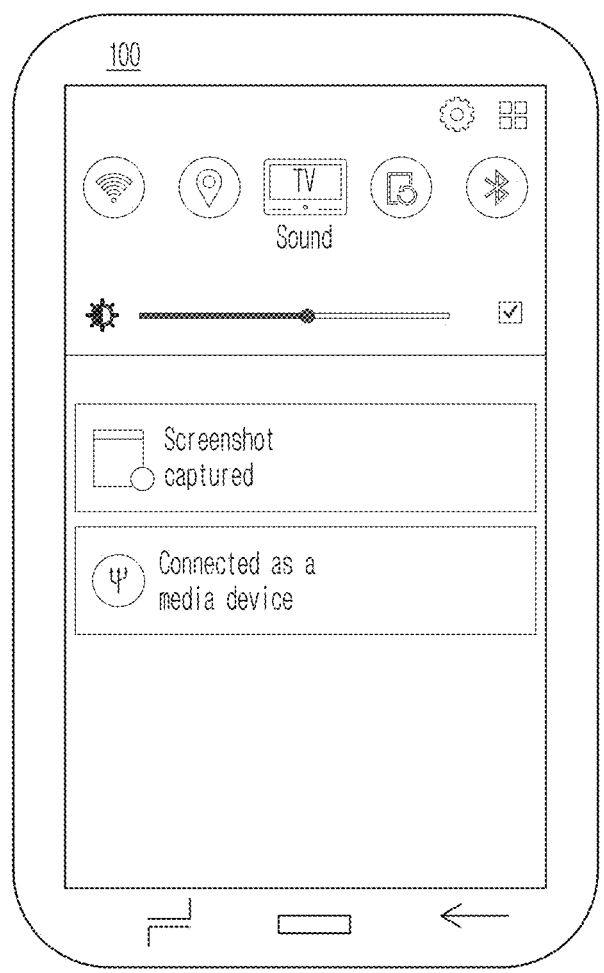

FIGS. 10A and 10B illustrate example scenarios in which behavior adaptation in an existing UI when electronic devices are connected to each other, according to various embodiments of the disclosure.

Referring to FIGS. 10A and 10B, behavior adaptation in existing UI when the smart phone is connected with the smart TV, based on the proposed methods, after mirroring phone's existing UI functionality will override by the TV function. In an example, a sound mode behavior overrides to a TV picture mode (i.e., standard mode, movie mode, and sports mode).

Figure 11:
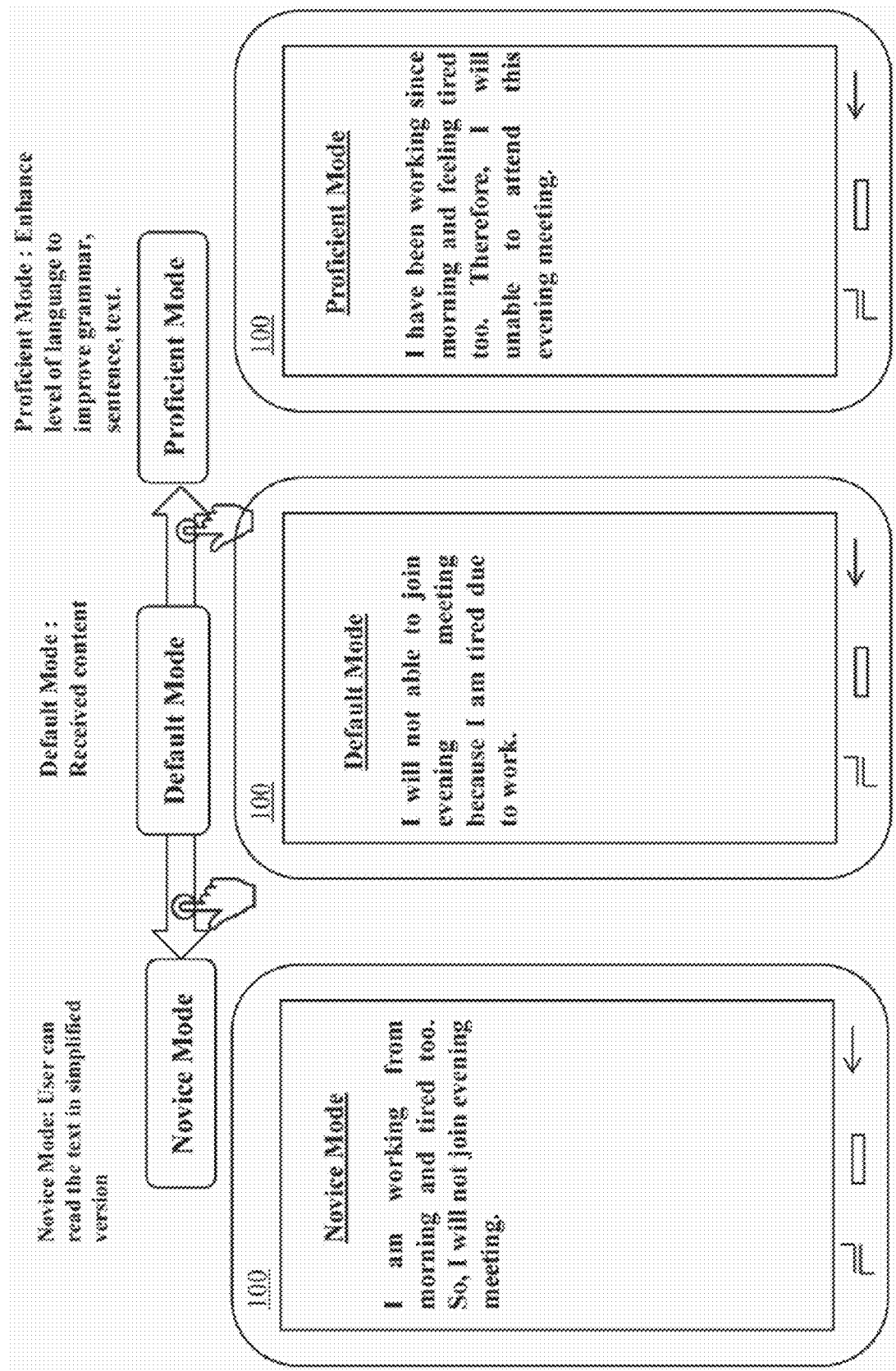
FIG. 11 is an example illustration in which an electronic device assists a user of the electronic device to understand text in a multiple understandable language mode, according to an embodiment of the disclosure.

FIG. 11 is an example illustration in which an electronic device assists a user to understand text in a multiple understandable language mode, according to an embodiment of the disclosure.

Referring to FIG. 11, an interaction and UI remodeling controller 240 identifies readable text and adds a recommendation to a user. Based on the proposed methods, in the novice mode, the user of the electronic device 100 can read the text in simplified version, in a default mode, the user of the electronic device 100 will read the content as it is, in a proficient mode, the user of the electronic device 100 enhances the level of language to improve grammar, sentence, and text.

The foregoing description of the specific embodiments is explained in line with the new application, however, the person ordinary skill in the art, the proposed method can be applicable to modify the one or more data items associated with an already installed application in the electronic device as well.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for optimizing a user interface (UI) of an application in an electronic device, the method comprising:
    detecting, by the electronic device, at least one first application installed in the electronic device;
    determining, by the electronic device, at least one data item associated with at least one UI of the at least one first application to be modified;
    modifying, by the electronic device, the at least one data item associated with the at least one UI of the at least one first application based on a level of proficiency of a user with an already used application in the electronic device; and
    displaying, by the electronic device, the at least one UI with the at least one modified data item of the at least one first application,
    wherein the modifying of the at least one data item comprises:
        acquiring, by the electronic device, the level of proficiency of the user with at least one data item associated with a UI of the already used application in the electronic device by using a machine learning model;
    wherein the machine learning model configured to work by extracting higher level embeddings for an input fed to it via a pre-trained encoder and decoding the higher level embeddings to obtain multi label outputs for each component and interaction under a plurality of labels, and
    wherein the modifying of the at least one data item comprises:
        modifying the at least one data based on scores of the plurality of labels.

2. The method of claim 1, wherein the at least one data item comprises a user interaction on the at least one UI, content on the at least one UI, and a component on the at least one UI.

3. The method of claim 1, wherein the modifying of the at least one data item comprises:
    selecting, by the electronic device, the at least one data item associated with the at least one UI of the at least one first application based on the level of proficiency of the user with the at least one data item associated with the UI of the already used application in the electronic device by using the machine learning model; and
    in response to selecting the at least one data item, modifying, by the electronic device, the at least one data item associated with the at least one UI of the at least one first application.

4. The method of claim 1, wherein the modifying of the at least one data item comprises:
    modifying a swipe component to a button component based on the level of proficiency of the user; and
    modifying an input field such that highlighted text is displayed in an input component.

5. The method of claim 1, further comprising:
    determining the level of proficiency of the user with the already used application in the electronic device by:
        determining gestures and actions of the user performed on any component using a parameter; and
    wherein the parameter comprises a type of a UI component, a number of the UI component, a UI component identifier, and a UI component parameter.

6. The method of claim 1, wherein the modifying of the at least one data item comprises:
    determining a similarity between a function of the at least one first application and a function of the already used application;
    determining an interaction type to be modified; and
    modifying the data item of the at least one first application based on the determined similarity.

7. The method of claim 1, wherein the method further comprises:
    based on a historical communication pattern comprising a user interaction of adjusting volume while the electronic device is connected with an external apparatus, generating new UI element for adjusting a volume separately.

8. The method of claim 1, wherein the method further comprises:
    identifying readable text and adds a recommendation to the user;
    providing a text of a content as a simplified version in a novice mode; and
    providing a text of the content as it is in a proficient mode.

9. The method of claim 3, wherein the selecting of the at least one data item comprises:
    training, by the electronic device, at least one of a content selection model, an interaction selection model, or an interface selection model based on the level of proficiency of the user with the at least one data item associated with the UI of the already used application in the electronic device; and
    selecting, by the electronic device, the at least one data item associated with the at least one UI of the at least one first application based on at least one of the trained content selection model, the trained interaction selection model, or the trained interface selection model.

10. The method of claim 9, wherein the training of the content selection model comprises:

formatting a dependency tree of content that allows proper connectivity of words as per grammar of a language;

performing an analysis on the content; and training the content selection model based on the analysis on the content.

11. The method of claim 10, wherein the analysis comprises a syntax analysis which comprises framing a sentence as per grammar of the language.

12. The method of claim 10, wherein the analysis comprises a semantic analysis which comprises analyzing and understanding a meaning of a sentence understandable to a user of the electronic device.

13. The method of claim 10, wherein the analysis comprises a discourse analysis which comprises checking a context of a previous statement so that coherence of all sentences are maintained.

14. The method of claim 10, wherein the analysis comprises a pragmatic analysis which comprises checking a sentence for validation as per practical knowledge.

15. The method of claim 1, further comprising determining the level of proficiency of the user with the already used application in the electronic device by:

learning at least one of a usage or a modification on the at least one data item associated with at least one UI of the already used application in the electronic device over a period of time using a plurality of parameters;

training a machine learning model in response to learning at least one of the usage or the modification on the at least one data item associated with at least one UI of the already used application in the electronic device over the period of time; and determining the level of proficiency of the user with the already used application in the electronic device using the machine learning model.

16. The method of claim 15, wherein the plurality of parameters comprise at least one of trip characteristics, an action status, a UI visibility, a correction pattern, erasability information, or a completion status.

17. An electronic device for optimizing a user interface (UI) of an application, the electronic device comprising:

a memory;

a processor configured to be coupled with the memory and control the electronic device; and a UI optimization controller coupled with the memory and the processor, the UI optimization controller being configured to:

detect at least one first application installed in the electronic device, determine at least one data item associated with at least one UI of the at least one first application to be modified, modify the at least one data item associated with the at least one UI of the at least one first application based on a level of proficiency of a user with an already used application in the electronic device, and display the at least one UI with the at least one modified data item of the at least one first application, wherein the processor further configured to:

acquire the level of proficiency of the user with at least one data item associated with a UI of the already used application in the electronic device by using a machine learning model;

wherein the machine learning model configured to work by extracting higher level embeddings for an input fed to it via a pre-trained encoder and decoding the higher level embeddings to obtain multi label outputs for each component and interaction under a plurality of labels, and wherein the processor further configured to:

modify the at least one data based on scores of the plurality of labels.

18. The electronic device of claim 17, wherein the at least one data item comprises a user interaction on the at least one UI, content on the at least one UI, and a component on the at least one UI.

19. The electronic device of claim 17, wherein, as at least part of the modifying of the at least one data item, the UI optimization controller is further configured to:

select the at least one data item associated with the at least one UI of the at least one first application based on the level of proficiency of the user with the at least one data item associated with a UI of the already used application in the electronic device by using the machine learning model, and in response to selecting the at least one data item, modify the at least one data item associated with the at least one UI of the at least one first application.

20. The electronic device of claim 19, wherein, as part of the selecting of the at least one data item, the UI optimization controller is further configured to:

train at least one of a content selection model, an interaction selection model, or an interface selection model based on the level of proficiency of the user with the at least one data item associated with the UI of the already used application in the electronic device, and select the at least one data item associated with the at least one UI of the at least one first application based on at least one of the trained content selection model, the trained interaction selection model, or the trained interface selection model.

21. The electronic device of claim 17, wherein the UI optimization controller is further configured to determine the at least one data item in response to the at least one first application being installed in the electronic device.

22. The electronic device of claim 17, wherein the UI optimization controller is further configured to:

determine a user historical communication pattern (HCP) based on graphical user interface (GUI)/interaction information from the already used application, in response to the at least one first application being executed, determine problematic UI data items by extracting data items of the at least one UI and matching the data items with the HCP, and modify the at least one data item based on the matching.

23. The electronic device of claim 17, wherein the UI optimization controller is further configured to modify the at least one data item by providing one or more icons associated with one or more applications different to the at least one first application together with the at least one data item associated with the at least one UI of the at least one first application.

24. A non-transitory computer-readable storage medium configured to store one or more computer programs including instructions which, when executed by at least one processor of an electronic device, cause the at least one processor to control for:

detecting an application installed in the electronic device;

after the application is installed, determining to modify a data item associated with a user interface (UI) of the application;

in response to determining to modify the data item, modifying the data item associated with the UI of the application based on a level of proficiency of a user with an already used application in the electronic device; and displaying the UI with the modified data item of the application, wherein the modifying of the data item comprises:
acquiring, by the electronic device, the level of proficiency of the user with at least one data item associated with a UI of the already used application in the electronic device by using a machine learning model;

wherein the machine learning model configured to work by extracting higher level embeddings for an input fed to it via a pre-trained encoder and decoding the higher level embeddings to obtain multi label outputs for each component and interaction under a plurality of labels, and wherein the modifying of the at least one data item comprises:
modifying the at least one data based on scores of the plurality of labels.

* * * * *